(12) United States Patent
Rousu et al.

(10) Patent No.: US 8,880,096 B2
(45) Date of Patent: Nov. 4, 2014

(54) DETERMINATION OF RECEIVER PATH DELAY

(71) Applicant: Broadcom Corporation, Irvine, CA (US)

(72) Inventors: Seppo Olavi Rousu, Oulu (FI); Jouni Kristian Kaukovuori, Vantaa (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/875,492

(22) Filed: May 2, 2013

(65) Prior Publication Data

US 2014/0141799 A1 May 22, 2014

(30) Foreign Application Priority Data

May 31, 2012 (GB) .................................. 1209743.2
Apr. 12, 2013 (GB) .................................. 1306729.3

(51) Int. Cl.
*H04W 88/02* (2009.01)
*G01S 19/23* (2010.01)
*H04W 24/00* (2009.01)
*G01S 5/02* (2010.01)
*H04B 17/00* (2006.01)
*G01S 5/10* (2006.01)

(52) U.S. Cl.
CPC .............. *G01S 5/021* (2013.01); *G01S 19/235* (2013.01); *H04B 17/0085* (2013.01); *G01S 5/10* (2013.01); *H04W 24/00* (2013.01); *H04B 17/0057* (2013.01); *H04B 17/0072* (2013.01)
USPC ...................................................... 455/456.1

(58) Field of Classification Search
USPC ....................................................... 455/456.1
See application file for complete search history.

(56) References Cited

U.S. PATENT DOCUMENTS

2004/0073392 A1    4/2004  Immonen et al.
2005/0175039 A1*   8/2005  Haefner et al. ............... 370/503

FOREIGN PATENT DOCUMENTS

EP      2204664       7/2010
JP      2007096647    4/2007

* cited by examiner

*Primary Examiner* — Diane Mizrahi
(74) *Attorney, Agent, or Firm* — Stanton IP Law

(57) ABSTRACT

Measures for determination of a receiver path delay for timing value measurement. Such measures may comprise causing a temporary signal variation at a start point element of a receiver path for receiving a positioning-related signal for timing value measurement, detecting the temporary signal variation at an end point element of the receiver path, and determining a time difference between a timing of causing the temporary signal variation at the start point element and a timing of detecting the temporary signal variation at the end point element as a delay value of the receiver path.

19 Claims, 16 Drawing Sheets

DETERMINATION OF RECEIVER PATH DELAY

CROSS REFERENCE TO RELATED APPLICATIONS

This application claims benefit under 35 U.S.C. §119(a) and 37 CFR 1.55 to UK patent application no. GB1209743.2 31, filed on 31 May 2012 and UK patent application no. GB1306729.3, filed on 12 Apr. 2013, the entire contents of which are hereby incorporated by reference.

TECHNICAL FIELD

The present disclosure relates to determination of receiver path delay. In particular, but not exclusively, the present disclosure relates to measures (including methods, apparatuses and computer program products) for determining receiver path delay for timing value measurement.

BACKGROUND

In modern and future communication systems, location services and location-based services (LCS) are gaining more attention and importance. In order to enable provision of location services and location-based services for terminals in modern and future communication systems, an accurate geographical positioning (hereinafter just 'positioning') of the terminals is vital. An accurate positioning is for example particularly valuable in (e.g. VoLTE) emergency use cases, for public safety, for mobile drive tests, under indoor conditions, urban canyons, tunnels, parking halls, subways, vehicles, for mobile drive tests, and the like.

In the framework of 3GPP standardization, LTE control plane signaling support for LCS is introduced from 3GPP Release 9 onwards. Therein, assisted satellite positioning is specified as a primary positioning/localization technique, whilst both a cell ID based positioning and OTDOA-based positioning are specified as fallback positioning/localization techniques in the event that the terminal lacks satellite positioning capability or the assisted satellite positioning fails e.g. due to non-availability of a required number of positioning satellite signals.

The assisted satellite positioning is based on at least four positioning satellite signals of GPS or any other satellite-based positioning system, while the network may provide assistance data for a reliable fix of the position.

The cell ID based positioning and enhancements thereof are based on the fact that the responsible server (e.g. E-SMLC) knows the geographical locations of the cells, that the timing advance can be used to find a terminal's distance from each base station antenna in the vicinity, and that neighbor cell measurements and the like can be used to increase the accuracy of the positioning. That is to say, the consideration of neighbor cells enhances accuracy of positioning.

The OTDOA-based positioning is based on the measurement of an observed time difference of arrival (OTDOA) on the basis of a positioning-related signal. In this regard, a terminal's position can be multi-laterated (typically tri-laterated) with the knowledge of multiple (typically three) base stations' transmit timings and their geographical locations and received time differences of at least two other cells relative to the serving cell of the terminal. In this regard, the terminal detects positioning-related signals from multiple (typically at least three) base stations in the vicinity.

When an increased accuracy of positioning results is desired in a specific communication system, the accuracy of positioning of at least one of the positioning/localization techniques specified for that specific communication system should be improved. The accuracy of positioning of the assisted satellite positioning and the cell ID based positioning may not be easily improved without requiring fundamental changes to the functional and/or structural configuration of the underlying satellite-based positioning system and communication system, respectively. Therefore, when an increased accuracy of positioning results is desired in a 3GPP-based LTE communication system, the accuracy of positioning of the OTDOA-based positioning should preferably be improved.

In this regard, it has conventionally been proposed to measure a receiver path delay which is then taken into consideration for deriving a timing value for the OTDOA-based positioning, thus improving the positioning accuracy. In such conventional techniques, a test or reference signal is typically generated and used for delay measurement on the receiver path, and a relative time difference between this test or reference signal and another signal (e.g. a positioning-related signal, another reference signal, etc.) is determined as an absolute delay value of the receiver path in question.

For example, EP 2 204 664 suggests to measure a relative difference between a reference signal and a delay reference signal, wherein a specific calibration signal or two reference signals are provided to a terminal (including the receiver path in question) by the network, thus requiring the network to provide support for terminal delay measurement. Further, US2004/073392 and JP 2007 096647 A suggest systems where a specific reference signal is created in a device circuitry, which signal is then used for measuring the delay in the receiver path, thus requiring extra hardware (such as a separate signal source, hardware for injecting the signal into the receiver path, etc.) and/or extra power consumption in the device for generating the test or reference signal.

In order to increase accuracy of positioning results, i.e. to improve the positioning accuracy of a timing-based positioning technique (e.g. the OTDOA-based positioning technique), the accuracy of (a measurement of) an underlying timing or timing value at the terminal to be positioned or localized should be improved, preferably whilst avoiding drawbacks of conventional systems, e.g. without requiring network support, extra hardware, extra power consumption, or the like.

Thus, there is a corresponding desire to improve the accuracy of timing and/or timing measurement for a timing-based positioning technique.

SUMMARY

According to first embodiments, there is a method of determining receiver path delay, the method comprising:

causing a temporary signal variation at a start point element of a receiver path for receiving a positioning-related signal for timing value measurement;

detecting the temporary signal variation at an end point element of the receiver path; and determining a time difference between the time of causing the temporary signal variation at the start point element and the time of detecting the temporary signal variation at the end point element as a delay value of the receiver path.

According to second embodiments, there is apparatus for use in determining receiver path delay on a terminal side of a cellular system, the apparatus comprising at least one processor, and at least one memory including computer program code, the at least one memory and the computer program code being configured to, with the at least one processor, cause the apparatus at least to:

cause a temporary signal variation at a start point element of a receiver path for receiving a positioning-related signal for timing value measurement;

detect the temporary signal variation at an end point element of the receiver path; and determine a time difference between a time of causing the temporary signal variation at the start point element and a time of detecting the temporary signal variation at the end point element as a delay value of the receiver path According to third embodiments, there is a computer program product comprising a non-transitory computer-readable storage medium having computer readable instructions stored thereon, the computer readable instructions being executable by a computerized device to cause the computerized device to determine receiver path delay by at least:

causing a temporary signal variation at a start point element of a receiver path for receiving a positioning-related signal for timing value measurement;

detecting the temporary signal variation at an end point element of the receiver path; and determining a time difference between the time of causing the temporary signal variation at the start point element and the time of detecting the temporary signal variation at the end point element as a delay value of the receiver path.

By way of example embodiments of the present disclosure, there is provided a determination of a receiver path delay for timing value measurement. Thereby, the accuracy of timing and/or timing measurement for a timing-based positioning technique may be improved at the terminal to be positioned or localized.

Thus, enhancements are achieved by methods, apparatuses and computer program products enabling determination of a receiver path delay for timing value measurement. Further, enhancements are achieved by methods, apparatuses and computer program products enabling consideration of a determined receiver path delay in timing value measurement.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 2a and 2b, shows schematic block diagrams illustrating example structures at an apparatus to be positioned, for which embodiments of the present disclosure are applicable;

DETAILED DESCRIPTION

Figure 1:
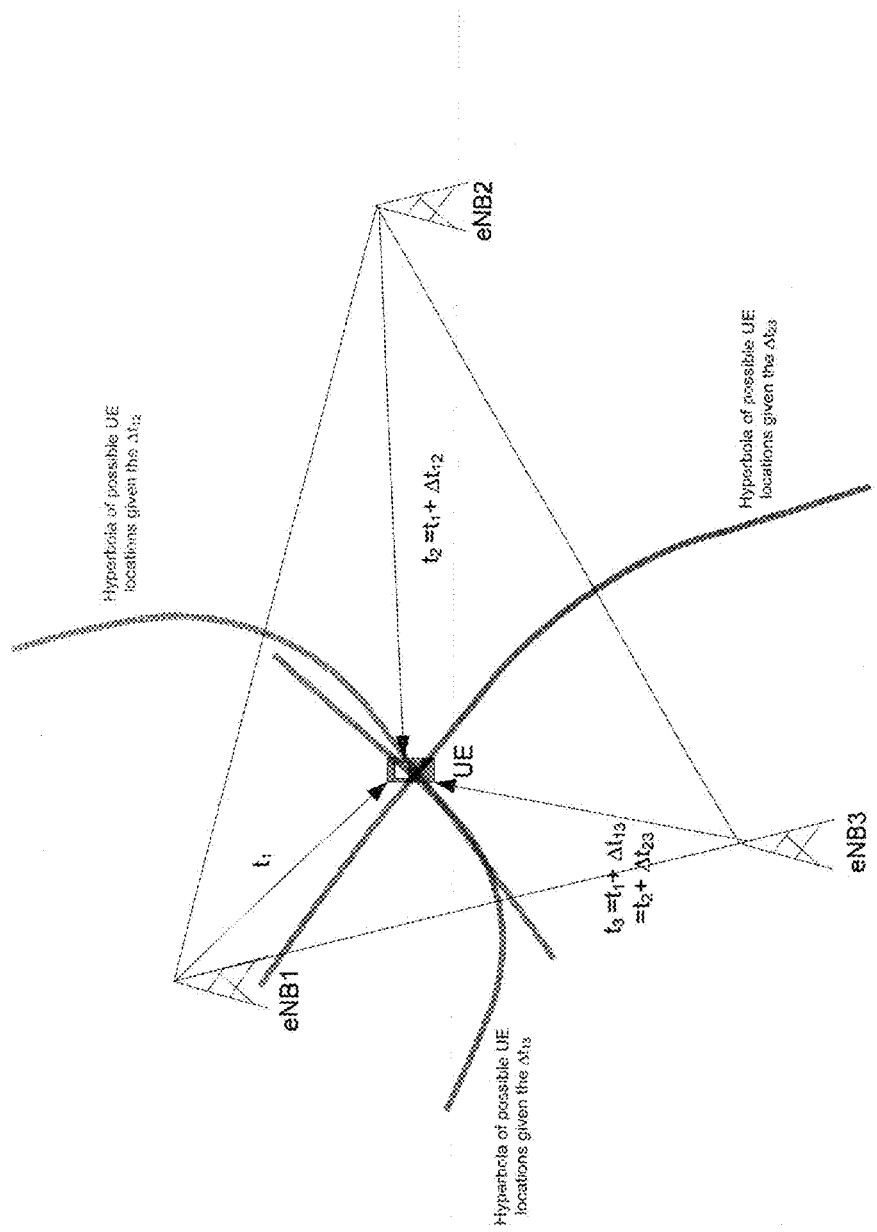
FIG. 1 shows a schematic diagram illustrating a system scenario of a timing-based positioning technique, for which embodiments of the present disclosure are applicable.

Example aspects of the present disclosure will be described herein below. More specifically, example aspects of the present disclosure are described hereinafter with reference to particular non-limiting examples and embodiments of the present disclosure. A person skilled in the art will appreciate that the invention is by no means limited to these examples, and may be more broadly applied.

It is to be noted that the following description of the present disclosure and its embodiments mainly refers to specifications being used as non-limiting examples for certain example network configurations and deployments. Namely, the present disclosure and its embodiments are mainly described in relation to 3GPP specifications being used as non-limiting examples for certain example network configurations and deployments. In particular, an LTE/LTE-Advanced communication system is used as a non-limiting example for the applicability of thus described example embodiments. As such, the description of example embodiments given herein specifically refers to terminology which is directly related thereto. Such terminology is only used in the context of the presented non-limiting examples, and naturally does not limit the invention in any way. Rather, any other network configuration or system deployment, etc. may also be utilized as long as compliant with the features described herein.

In particular, the present disclosure and its embodiments may be applicable in any (cellular) communication system and/or network deployment in which a timing-based positioning technique is applicable at/for a terminal to be positioned or localized.

Hereinafter, various embodiments and implementations of the present disclosure and its aspects or embodiments are described using several alternatives. It is generally noted that, according to certain needs and constraints, all of the described alternatives may be provided alone or in any conceivable combination (also including combinations of individual features of the various alternatives).

According to embodiments of the present disclosure, in general terms, there are provided mechanisms, measures and means for enabling determination of a receiver path delay for timing value measurement (and consideration of a determined receiver path delay in timing value measurement).

In the following, embodiments of the present disclosure are described with reference to methods, procedures and functions, as well as with reference to structural arrangements and configurations.

More specifically, without restricting generality, the present disclosure and embodiments thereof are described with reference to an example case of OTDOA-based positioning in a 3GPP-based LTE communication system, in heterogeneous network deployments, in self-organizing network deployments, or the like. Also, the present disclosure and embodiments thereof are equally applicable in/for any timing-based positioning system, in any communication system or technology, in any global navigation satellite system (GNSS) or technology (including a downlink satellite communication system, a downlink/uplink satellite (e.g. GPS, Glonass, Galileo, Beidou, Compass, sbas, qzss, etc.) communication system, a short range communication system, a cellular communication system) utilizing any timing-based positioning or localization technique.

In the following, where appropriate, OTDOA is adopted as a non-limiting example for a network-based/remote positioning technique, and GPS is adopted as a non-limiting example for a terminal-based/local positioning technique.

In particular, whilst (remote) OTDOA-based positioning at the network side is taken as a non-limiting example herein, (local) GPS-based positioning at the apparatus to be positioned is also applicable in accordance with embodiments of the present disclosure. Also, a combination of both positioning techniques, i.e. a combined/integrated OTDOA- and GPS-based positioning, is applicable in accordance with embodiments of the present disclosure. Further, a combination of GNSS positioning techniques, e.g. combined/integrated Galileo- and GPS-based positioning, is applicable in accordance with embodiments of the present disclosure. Still further, a combination of OTDOA and GNSS positioning techniques, i.e. a combined/integrated OTDOA, Galileo- and GPS-based positioning, is applicable in accordance with embodiments of the present disclosure.

FIG. 1 shows a schematic diagram illustrating a system scenario of a timing-based positioning technique, for which embodiments of the present disclosure are applicable.

In the example scenario according to FIG. 1, it is assumed that a terminal UE is to be positioned or localized using OTDOA-based positioning with respect to three base stations or access nodes eNB1, eNB2, eNB3 serving cells of the underlying cellular communication system. For example, eNB1 may be assumed to be the base station or access node of the cell currently serving the UE (which may be referred to as a primary cell), which may be used as a reference for OTDOA measurements. The base stations or access nodes respectively transmit positioning-related signals, such as PRS signals in the DL direction. The timing values relating to the individual base stations or access nodes, which are used for OTDOA-based positioning, are measured at the UE on the basis of the received positioning-related signals, and they are shown in their mutual relationship in FIG. 1.

In OTDOA-based positioning, required neighbor cell information is provided from a server (not shown), such as an E-SMLC, to the UE. The UE measures the OTDOA timing values of each neighbor relative to the serving cell based on such neighbor cell information, such as base station physical cell IDs or global cell IDs, and provides the (corrected) measured OTDOA timing values and possibly some extracted information, such as base station physical cell IDs, global cell IDs and/or transmitting antenna IDs for timing measured signals, to the server for triangulating the UE position based thereon. The server then calculates the UE position, as indicated by a crossing point of three hyperbolas in FIG. 1, on the basis of the thus provided OTDOA timing values of the neighbor cells and the local knowledge of real cell positions and transmit timings.

Figure 2:
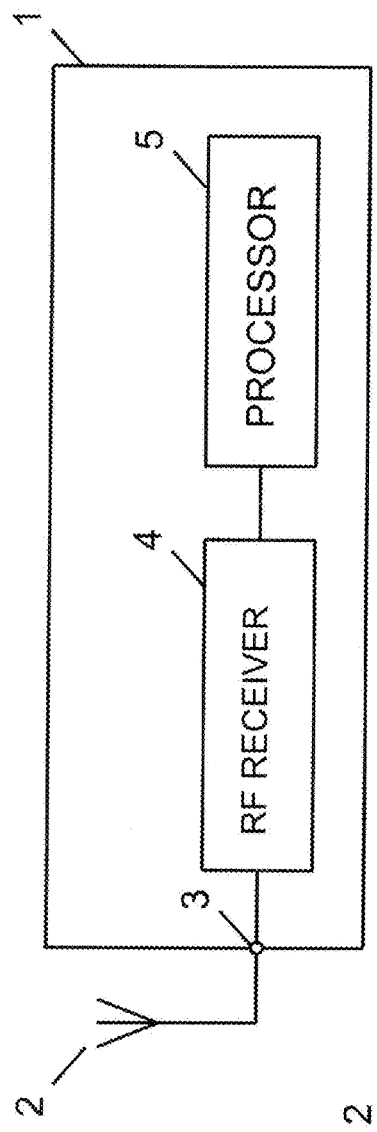
FIG. 2, comprising
Figure 2:
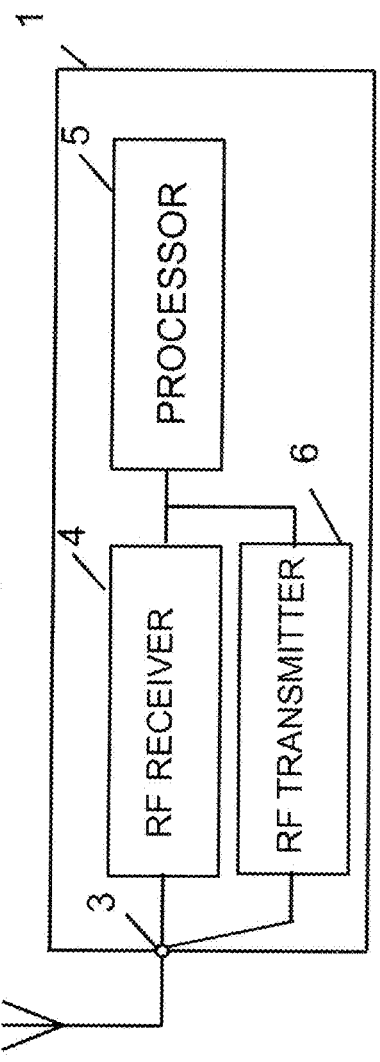

FIG. 2, comprising FIGS. 2a and 2b, shows schematic block diagrams illustrating example structures at an apparatus to be positioned, for which embodiments of the present disclosure are applicable. Referring to the example scenario of FIG. 1, the apparatus to be positioned may be the UE.

FIG. 2a shows a schematic block diagram illustrating a receiver path at an apparatus to be positioned, for which embodiments of the present disclosure are applicable. The thus illustrated apparatus may for example include a GPS positioning device or the like, i.e. a device which locally performs timing-based positioning calculation on the basis of a satellite-originated positioning-related signal.

It is noted that the apparatus to be positioned may, at least in some embodiments, also have one or more other receiver paths, which are not shown FIG. 2a. Alternate receiver paths may be operational at the same frequency (or component carrier) and/or an alternate frequency (or component carrier) to the first receiver path. For example, the apparatus may have a receiver path or multiple receiver paths for positioning signals at different frequencies, which may be one or more of GPS L1 frequency, GPS L2 frequency, GPS L5 frequency, Glonass frequency/frequencies, Galileo frequency/frequencies, Beidou frequency/frequencies, Compass frequency/frequencies, sbas frequency/frequencies, qzss frequency/frequencies, FDD cellular frequencies, TDD cellular frequencies, or the like. In certain embodiments of the present disclosure, a receiver or receiver path may be operational simultaneously at two or more positioning signals, frequencies or bandwidths.

In this regard, it is to be noted that different global navigation satellite systems or technologies, such as those listed above, exhibit differences in their operational conditions, which impact hardware delay on the receiver path. In particular, various global navigation satellite systems or technologies may have different signal bandwidths. For example, while Galileo and GPS operate at the same frequency, they differ in signal bandwidth. In this regard, bandwidth is meant to generally refer to an example of a parameter which impacts on hardware delay on the receiver path. As a non-limiting example, various filters in the receiver path may be set to different bandwidths, which affect the delay of the received signal in these filters, even if the central frequency of the different signals is the same. Further, various global navigation satellite systems or technologies may also, i.e. additionally or alternatively, differ in at least one or more parameters impacting hardware delay on the receiver path, which may for example include clocking, modulation, chip rate, code period, symbol rate (i.e. number of symbols per second), and/or navigation frame rate (i.e. number of navigation frames per second), respectively.

As shown in FIG. 2a, the apparatus 1 to be positioned may include an antenna 2 connected via an antenna port or connector 3 to the internal receiver path typically composed of an RF receiver means or circuitry 4 (possibly including receiver front-end means or circuitry) and a processor (e.g. a digital baseband) means or circuitry 5. Also, at least an interface between the antenna 2 and the RF receiver means or circuitry 4 and an interface between the RF receiver means or circuitry 4 and the processor 5 are included in the receiver path. Accordingly, any signal received by the antenna is subject to a specific delay on the receiver path between the antenna port or connector 3 and the processor means or circuitry 5, which delay may depend on one or more parameters (referred to as reception parameters herein).

FIG. 2b shows a schematic block diagram illustrating a receiver path and a transmitter path at an apparatus to be positioned, for which embodiments of the present disclosure are applicable. The thus illustrated apparatus may for example include a device to be positioned by OTDOA or the like, i.e. a device for which timing-based positioning calculation is remotely performed at the network side on the basis of a network/cell-originated positioning-related signal, or a device to be positioned by OTDOA or the like in combination with GPS, i.e. a GPS positioning device additionally operable for OTDOA positioning in a cellular network.

It is noted that the apparatus to be positioned may, at least in some embodiments, also have one or more other receiver and/or transmitter paths, which are not shown FIG. 2b. One or more other receiver and/or transmitter paths may operate at one operational frequency or component carrier or multiple operational frequencies or component carriers.

As shown in FIG. 2b, in addition to the antenna structure and the receiver path which correspond to the antenna structure and the receiver path shown and described according to FIG. 2a above, the apparatus 1 to be positioned may include an internal transmitter, to which the antenna 2 is also connected via the antenna port or connector 3. The internal transmitter path is typically composed of an RF transmitter means or circuitry 6 (possibly including transmitter front-end means or circuitry) and the processor (e.g. a digital baseband) means or circuitry 5. Accordingly, any signal to be transmitted proceeds via the transmitter path between the processor means or circuitry 5 and the antenna port or connector 3, which may also cause a delay similar to that in the receiver path (whilst such transmit delay is not specifically addressed in the present specification).

As evident from the following description, a transmitter path in an apparatus to be positioned is specifically usable for signaling (corrected) measured OTDOA timing values in the uplink direction towards the network, thereby enabling a position calculation at the network, e.g. the server.

It is noted that the apparatus to be positioned may, at least in some embodiments, have multiple (receive/transmit) antennas, a diversity antenna, MIMO antennas, alternate antennas, or the like at one or more operational frequencies, which are not shown in FIG. 2a or 2b.

It is further noted that in both structures according to FIGS. 2a and 2b, for embodiments of the present disclosure, a distribution of certain parts (such as D/A or A/D converters) within the receiver path (i.e. between the RF receiver and the processor) and/or the transmitter path (i.e. between the processor and the RF transmitter) is insignificant and may be implementation-dependent. As mentioned above, the receiver path and/or the transmitter path may include analog interfaces and/or digital interfaces (such as e.g. DigRF) e.g. in or between the RF receiver and/or the processor and/or e.g. in or between the processor and the TX transmitter. Still further, the receiver path and/or the transmitter path (i.e. any one of the RF receiver, RF transmitter and the processor) may include clocking, software components operating on respective hardware components, such as e.g. control software running on a control unit, software-driven data buffering, or the like.

Figure 3:
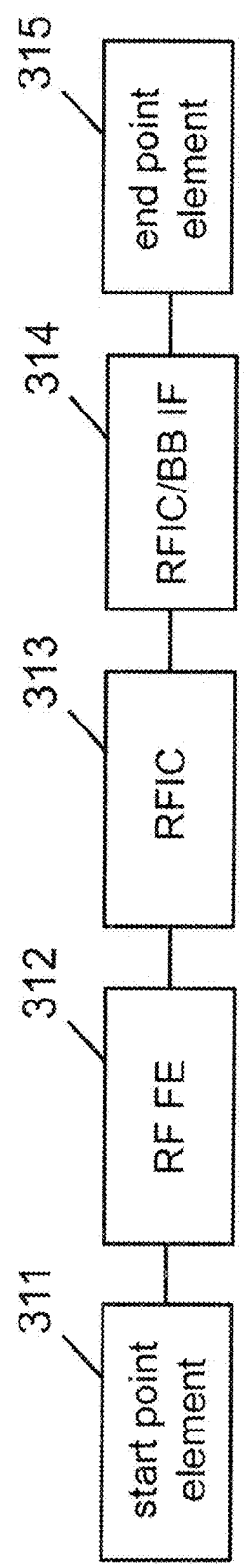
FIG. 3 shows a schematic block diagram illustrating a first example of a structure of a receiver path at an apparatus to be positioned, for which embodiments of the present disclosure are applicable.

FIG. 3 shows a schematic block diagram illustrating a first example of a structure of a receiver path at an apparatus to be positioned, for which embodiments of the present disclosure are applicable.

As shown in FIG. 3, a receiver path (which may be usable for receiving a positioning-related signal in the context of a timing-based positioning technique), may for example include a start point element 311 (such as e.g. an antenna interface, an antenna switch, an antenna tuner such as an antenna impedance tuner, an antenna aperture tuner or the like, an RF FE band selection switch, an LNA, etc.), various receiver path elements 312 to 314, and an end point element 315 (such as e.g. a processor, a digital baseband circuit, a modem baseband circuit, etc.). In the illustrated example, receiver path elements are assumed to be a radio-frequency front end (RF FE) 312, e.g. a radio-frequency front end module (RF FEM) or a radio-frequency front end (RF FE) with discrete components or other special purpose implementation or integration with needed functionalities, a radio-frequency integrated circuit (RFIC) 313, and a radio-frequency/baseband interface (RF/BB IF) 314. It is to be noted that such a receiver path structure is an example for illustrative purposes, and any number and type of other receiver path elements are also conceivable between the start point element 311 and the end point element 315.

Figure 4:
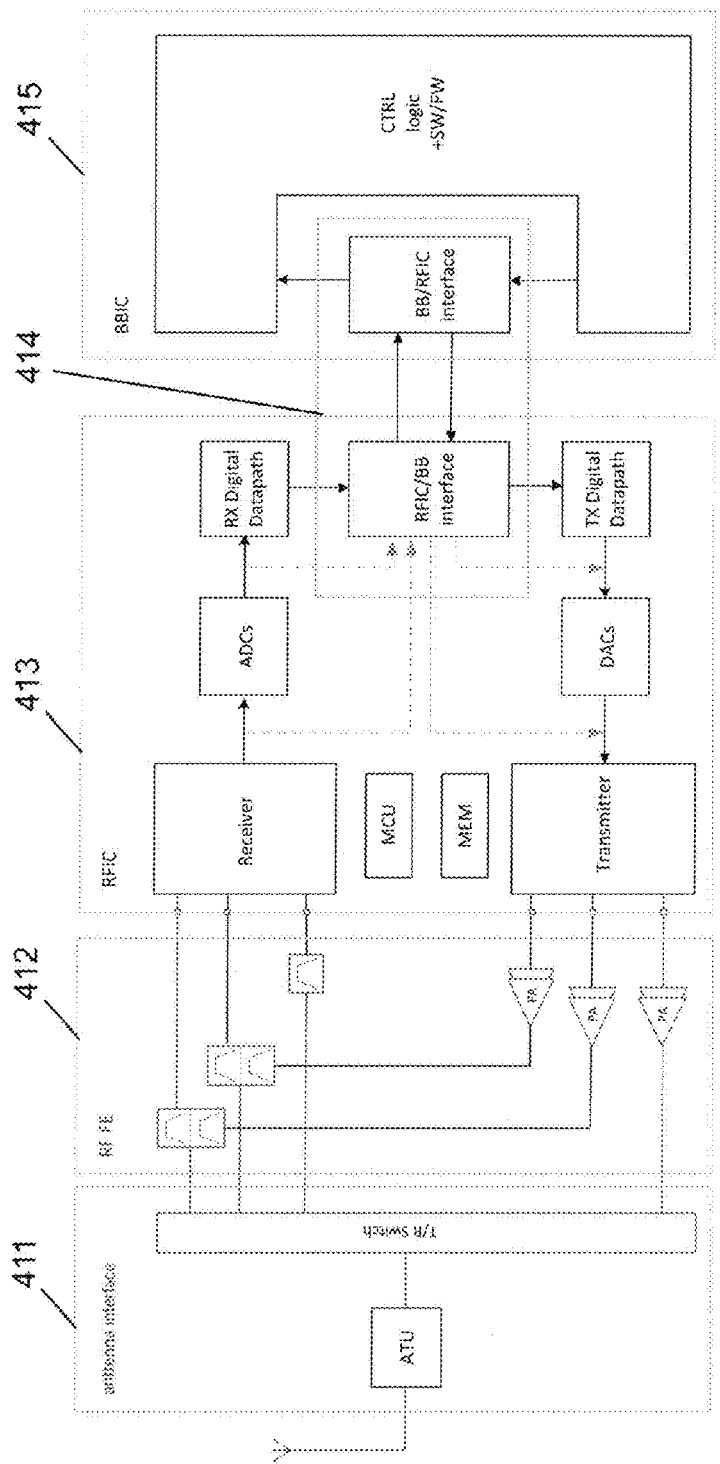
FIG. 4 shows a schematic block diagram illustrating a second example of a structure of a receiver/transmitter path at an apparatus to be positioned, for which embodiments of the present disclosure are applicable.

FIG. 4 shows a schematic block diagram illustrating a second example of a structure of a receiver/transmitter path at an apparatus to be positioned, for which embodiments of the present disclosure are applicable.

As shown in FIG. 4, a receiver/transmitter path (which may be usable for receiving a positioning-related signal in the context of a timing-based positioning technique), may for example include an antenna interface 411 (for example corresponding to the start point element 311 according to FIG. 3), which includes an antenna tuner unit ATU (which may for example include one or more antenna impedance tuners, one or more antenna aperture tuners, and/or the like) and an antenna switch denoted as T/R switch, various receiver/transmitter path elements 412 to 414, and a baseband integrated circuit (BBIC) 415 (for example corresponding to the end point element 315 according to FIG. 3 and/or the processor means or circuitry 5 according to FIG. 2), which includes a control logic incorporating software (SW) and/or firmware (FW). In the illustrated example, receiver/transmitter path elements are assumed to include a radio-frequency front end (RF FE) 412, which includes filter elements and power amplifiers (PA), a radio-frequency integrated circuit (RFIC) 413, which includes receiver and transmitter units, digital-to-analog and analog-to-digital converters (ADCs, DACs), a master control unit (MCU), and a memory (MEM), and a radio-frequency/baseband interface (RF/BB IF) 414, which includes an interface part at the RFIC 413 and an interface part at the BBIC 415. It is to be noted that such a receiver/transmitter path structure is an example for illustrative purposes, and any other number and type of receiver/transmitter path elements (including e.g. switch/es in series, switch/es in parallel, filter/s, duplexer/s, diplexer/s, frequency response and/or phase controllable filter/s, frequency response and/or phase controllable duplexer/s, frequency response and/or phase controllable diplexer/s, active/passive matching element/s, power detector/s, couplers, automatic gain control/s, isolator/s, or the like) is also conceivable between the start antenna interface 411 and the BBIC 415.

As indicated above, the receiver path illustrated in FIG. 3 could represent an example realization of the RF receiver means or circuitry 4 according to FIG. 2a, and the receiver/transmitter path illustrated in FIG. 4 could represent an example realization of the RF receiver means or circuitry 4 and the RF transmitter means or circuitry 6 according to FIG. 2b.

Accordingly, a receiver path configuration and/or a transmitter path configuration in the meaning of embodiments of the present disclosure may involve or factor in any one or any conceivable combination of the aforementioned features, aspects and properties.

Generally speaking, RF FE filtering may also have an impact on a receiver path delay due to filter group variations. Such filter group variations may depend on a temperature impact on the group delay of signals, a communication signal frequency and bandwidth impact on the group delay of signals, or the like. Also, a diversity/TRX main path filter may have different delays due to TX heating and different types of filters, different controls used to control frequency and/or phase response of filters, or the like.

Figure 5:
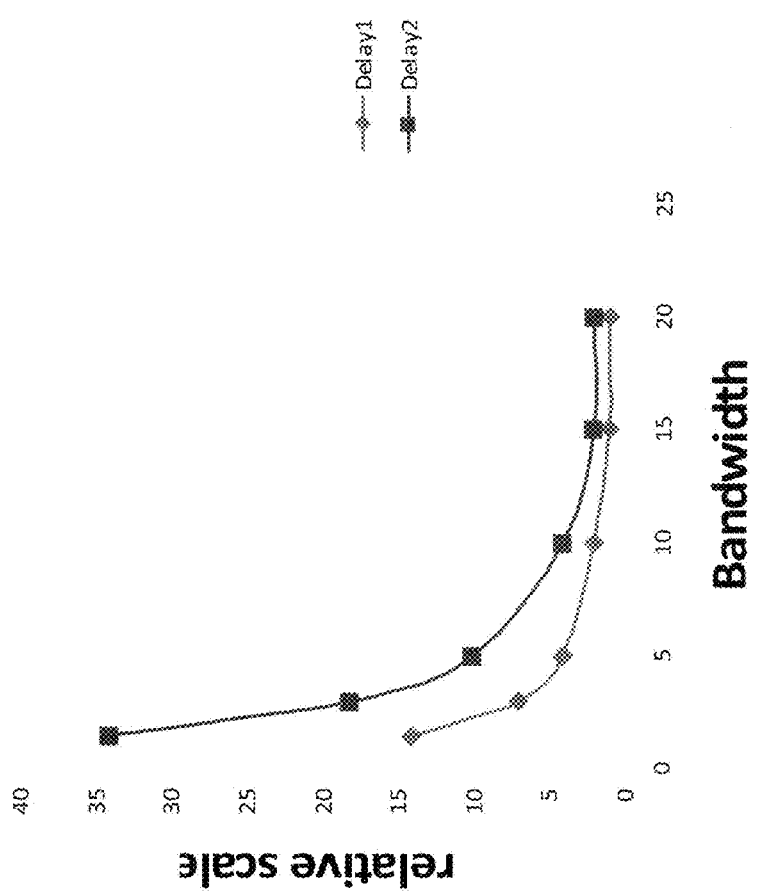
FIG. 5 shows a graph depicting example delay characteristics of a receiver path relative to an operating bandwidth.

FIG. 5 shows a graph depicting example delay characteristics of a receiver path relative to an operating bandwidth. In FIG. 5, operating bandwidth is plotted on the abscissa and a relative scale indicative of a delay value on the receiver path (e.g. relating to a RFIC element) is plotted on the ordinate, thus depicting bandwidth-related delay characteristics of a receiver path.

In FIG. 5, delay characteristic 1 refers to a case in which the receiver path does not involve a digital receiver front-end means or circuitry, whilst delay characteristic 2 refers to a case in which the receiver path does involve a digital receiver front-end means or circuitry. As can be seen from the graph of FIG. 5, delay characteristics of a receiver path are dependent on the operating bandwidth of the receiving operation (e.g. a bandwidth of the received signal, such as a positioning-related signal, like a GPS or Glonass signal), for example.

According to embodiments of the present disclosure, the start point element of the receiver path, i.e. the reference point for positioning or timing value measurement, may for example be an antenna interface, an antenna switch, a special purpose switch, a controllable phase shift circuit, an antenna tuner (e.g. an antenna impedance tuner, an antenna aperture tuner, etc.), a front end module switch (e.g. a RF FE band selection switch), an amplifier (an LNA), an attenuator (e.g. between the LNA and a mixer or, in special cases as an attenuator network, before the first amplifier on the RFIC), or the like. The end point element of the receiver path, i.e. the calculation point for positioning or timing value measurement, may for example be a processor, a digital (e.g. modem) baseband circuitry, or the like.

In OTDOA-based positioning, the relevant time difference for each neighbor cell (which may be referred to as a secondary cell) is measured at a certain reference point which, in cellular communication devices/modems, typically is the antenna port or connector 3 or the antenna interface 411 (i.e. the antenna tuner or the antenna switch), or an alternate reference point, the location offset error of which may be extracted or known, whilst the time difference is actually measured at another point which, in cellular communication devices/modems, typically is the processor (e.g. the digital baseband) means or circuitry 5 or the BBIC 415. As indicated by the RF receiver means or circuitry 4 according to FIG. 2 as well as the example structures according to FIGS. 3 and 4, there are typically multiple components/functional blocks for enabling various reception functionalities in the receiver path between the reference point for positioning or timing value measurement and the calculation point for positioning or timing value measurement.

In satellite-based (e.g. GPS) positioning, the relevant signal propagation time for each positioning (e.g. GPS) satellite is measured at a certain reference point which, in cellular communication devices/modems, typically is the antenna port or connector 3 or the antenna interface 411 (i.e. the antenna tuner or the antenna switch), or an alternate reference point, the location offset error of which may be extracted or known, whilst the signal propagation time is actually measured at another point which, in cellular communication devices/modems, typically is the processor (e.g. the digital baseband) means or circuitry 5 or the BBIC 415. As indicated by the RF receiver means or circuitry 4 according to FIG. 2 as well as the example structures according to FIGS. 3 and 4, there are typically multiple components/functional blocks for enabling various reception functionalities in the receiver path between the reference point for positioning or timing value measurement and the calculation point for positioning or timing value measurement.

In view thereof, the processor (e.g. the digital baseband) means or circuitry 5 or the BBIC 415 may be regarded as or may function as a positioning timing measurement means or circuitry according to embodiments of the present disclosure.

Accordingly, a delay on the receiver path is caused by receiver hardware and/or software/firmware between a reference point or an alternate reference point for positioning or timing value measurement (i.e. a start point element of the receiver path) and a calculation point for positioning or timing value measurement (i.e. an end point of the receiver path), depending on the applicable receiver path configuration.

Moreover, the delay on the receiver path (between a reference point or an alternate reference point for positioning or timing value measurement and a calculation point for positioning or timing value measurement) of the apparatus to be positioned is typically not constant but varies for different settings/setups/configurations of reception parameters and/or receiver path elements. This is because different reception parameters and/or receiver path elements could result in different delay characteristics of the receiver path or components/functional blocks thereof and/or different receiver path configurations with a different configuration of components/functional blocks and/or analog/digital interfaces being passed by the received signal. The receiver path or components/functional blocks thereof and/or different receiver path configurations are typically ODM, product concept, integration, implementation and/or chipset (i.e. vendor/customer/product) dependent.

The receiver path delay, i.e. the timing variation on the receiver path, influences the timing properties of any received signal. In the context of any timing-based positioning technique (e.g. OTDOA-based and/or satellite-based positioning such as GPS/Glonass/Galileo/Beidou/Compass/sbas/qzss/etc.), such delay on the receiver path (between a reference point or an alternate reference point for positioning or timing value measurement and a calculation point for positioning or timing value measurement) of the apparatus to be positioned adversely affects timing measurement accuracy and, thus, positioning accuracy.

In view of the above findings, it is desirable to determine accurately a delay (i.e. a hardware/software/firmware-related offset error) of a receiver path (between a reference point or an alternate reference point for positioning or timing value measurement and a calculation point for positioning or timing value measurement) at an apparatus to be positioned.

According to embodiments of the present disclosure, as described herein, the receiver path delay being determined is an absolute signal delay value between certain reference points, such as the start and end point elements, which can be used to correct timing value calculations.

Any one of the below-described methods and procedures, as illustrated in FIGS. 6 to 12, is operable or may be carried out at any apparatus to be positioned, e.g. a terminal such as the UE according to FIG. 1. An apparatus to be positioned suitable for carrying out the thus illustrated procedure may be any apparatus to be positioned having at least one receiver path, e.g. a terminal or user equipment, but does not necessarily have to include the receiver path as illustrated according to FIGS. 2 to 4.

The methods, procedures and functions described hereinafter mainly relate to an apparatus to be positioned, e.g. a terminal. Such terminal may include a mobile station (MS) or a user equipment (UE) or a modem (which may be installed as part of a MS or UE, but may also be a separate module, which can be attached to various devices, like in an automotive environment). Such terminal or modem is configured to be operable in at least one given frequency range/band or multiple frequency allocations or multiple bands or multiple radio access technologies. Generally, it is to be noted that, when reference is made herein to a terminal, MS or UE, such reference is equally applicable to a modem (which may be installed as part of a MS or UE, but may also be a separate module, which can be connected to various devices with wired or wireless connection).

According to embodiments of the present disclosure, the apparatus to be positioned belongs to a device class of delay measurement capable devices, e.g. (HW/SW-related) receiver path delay measurement capable devices.

According to embodiments of the present disclosure, the receiver path may be a receiver path for receiving a positioning-related signal for timing value measurement, such as a PRS in/for a timing-based positioning technique such as OTDOA and/or GPS and/or Galileo. As indicated above, it is to be noted that, for example, GPS and Galileo operate at the same frequency but differ in signal bandwidth. Accordingly, the same receiver (path) could be used for both global navigation satellite systems or technologies, but the difference in the signal bandwidths has to be taken into account in terms of (the resulting difference in) impacted receiver path delay for improving the positioning accuracy. Receiver(s) or receiver path(s) for the above systems may be operational independently or simultaneously according to embodiments of the present disclosure.

According to embodiments of the present disclosure, the start point element of the receiver path may be any conceivable reference point for positioning or timing value measurement, as described above, and the end point element of the receiver path may be any conceivable calculation point for positioning or timing value measurement, as described above.

According to embodiments of the present disclosure, the receiver path delay being determined is an absolute signal delay value between the start and end point elements, which can be used to correct timing value calculations.

Figure 6:
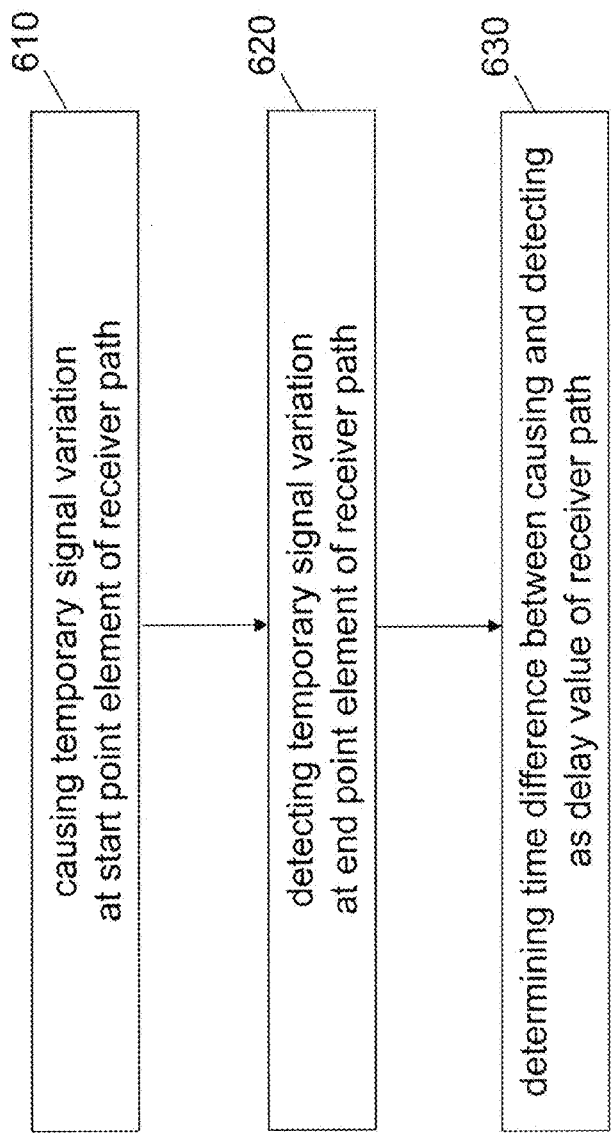
FIG. 6 shows a flowchart of an example of a procedure of receiver path delay determination according to embodiments of the present disclosure.

FIG. 6 shows a flowchart of an example of a procedure of receiver path delay determination according to embodiments of the present disclosure.

As shown in FIG. 6, a corresponding procedure according to embodiments of the present disclosure includes an operation (610) of causing a temporary signal variation at a start point element of a receiver path, an operation (620) of detecting the temporary signal variation at an end point element of the receiver path, and an operation (630) of determining a time difference between a time of causing the temporary signal variation at the start point element and a time of detecting the temporary signal variation at the end point element as a delay value of the receiver path.

According to embodiments of the present disclosure, the signal variation may be caused during receipt of a positioning-related signal for timing value measurement via a receiver path, which could be the receiver path in question and/or an alternate receiver path with a similar or equivalent configuration.

According to embodiments of the present disclosure, the signal variation may be a variation in terms of signal level and, thus, the receiver path delay determination may be based on signal level shifting, as described below in relation to FIGS. 7 and 8, and/or the signal variation may be a variation in terms of signal phase and, thus, the receiver path delay determination may be based on signal phase shifting, as described below in relation to FIGS. 9 and 10.

Generally, the signal to be monitored, e.g. the signal with varied signal power level and/or phase, may for example be a continuous wave signal, a modulated signal, a noise signal, a narrow band signal, a wide band signal, or the like. Further, the signal to be monitored, e.g. the signal with varied signal power level and/or phase, may be internal or external to an apparatus involving the signal/receiver path in question, and it may for example originate from a cellular network, a satellite, a signal generator, a local transmitter generated communication signal, a local transmitter generated test/self-test signal, or the like.

Figure 7:
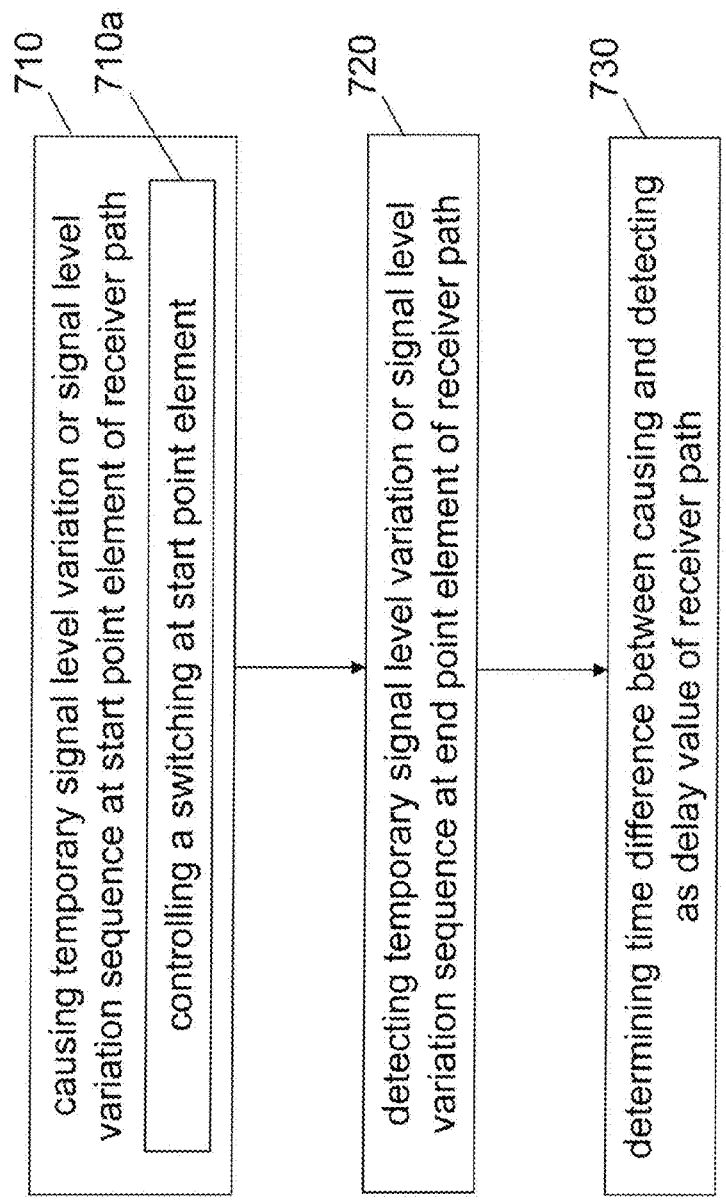
FIG. 7 shows a flowchart of a first example of a procedure of receiver path delay determination based on signal level shifting according to embodiments of the present disclosure.

FIG. 7 shows a flowchart of a first example of a procedure of receiver path delay determination based on signal level shifting according to embodiments of the present disclosure.

As shown in FIG. 7, a corresponding procedure according to embodiments of the present disclosure includes an operation (710) of causing a temporary signal level variation or signal level variation sequence at a start point element of a receiver path, an operation (720) of detecting the temporary signal level variation or signal level variation sequence at an end point element of the receiver path, and an operation (730) of determining a time difference between a time of causing the temporary signal level variation or signal level variation sequence at the start point element and a time of detecting the temporary signal level variation or signal level variation sequence at the end point element as a delay value of the receiver path.

According to embodiments of the present disclosure, the temporary signal level variation or signal level variation sequence may have a predefined/preconfigured shape or property, and may be caused at the start point element of the receiver path by way of any conceivable operation depending on the type of the start point element of the receiver path, as long as some signal level variation or signal level variation sequence is temporarily produced, which is detectable at the end point element of the receiver path. In embodiments, the signal level variation or signal level variation sequence is within the dynamic range of the receiver path, e.g. A/D conversion elements thereof.

As an example, the temporary signal level variation or signal level variation sequence may be caused by controlling—e.g. in a programmed manner—a switching of a connection state of an antenna switch (e.g. the T/R switch in the antenna interface 411 according to FIG. 4) as the start point element of the receiver path, controlling a switching of a connection state of a front end switch as the start point element of the receiver path, controlling a switching of a connection state of an antenna (swap) switch as the start point element of the receiver path, controlling switching of a filtering response/impedance of a filter as the start point element of the receiver path, controlling a switching of a control value of an antenna aperture tuner as the start point element of the receiver path, controlling a switching of a control value of an antenna impedance tuner as the start point element of the receiver path, and controlling a switching of a gain control value of an amplifier or an attenuator as the start point element of the receiver path, respectively. Accordingly, the causing operation (710) according to embodiments of the present disclosure may include an operation (710*a*) of performing a control of a corresponding switching at the start point element, which switching actually produces the temporary signal level variation or signal level variation sequence. While the switching as such is performed by the correspondingly controlled switch or the like, such control may be performed by some controlling entity such as a processor or the like so as so initiate, trigger or prompt such switching by the switch or the like.

In this example, at the moment of measurement start, the start point element (e.g. the antenna switch) is temporarily (controlled to be) switched, e.g. the connection state in the example of a switch such as the antenna switch is (controlled to be) temporarily changed, to cause a temporary signal power level drop/rise to the receiver signal path. The thus varied signal propagates in the receiver path from the start point (i.e. the reference point or alternate reference point) to the end point (i.e. the calculation point where signal processing is carried out) via the intermediate receiver path element/s, such as RF FE, RFIC and RF/BB interface in the example of FIG. 3. The thus arrived temporary signal power drop/rise is detected at the end point element when the signal has propagated through the receiver path.

The switching of a switch may be such that the connection state (e.g. of the antenna switch) is changed from ON to OFF to ON or, vice versa, from OFF to ON to OFF. The switching of an amplifier or an attenuator may be such that the gain control value (e.g. of the LNA) is changed from LOW to HIGH to LOW or, vice versa, from HIGH to LOW to HIGH, wherein LOW and HIGH may represent any arbitrary values in this regard.

Referring to the example of an antenna switch, the antenna switch isolation is typically about 25 dB, but may vary for example according to device and/or frequency. The power level drop, i.e. the signal/noise power level variation, caused by an ON-OFF-ON switching of the antenna switch is typically within the receiver dynamic range (whilst the dynamic range may be controlled prior to signal level variation in order to keep the wanted signal in the operational dynamic range of the receiver path). Such temporary signal level drop can be detected e.g. in the modem BB or the BBIC, wherein the delay measurement can be changed in a digital word. The ON/OFF speed of the antenna switch is typically of the order of microseconds (depending on available current and selected technology and definition for duration of switch period). So, such switching can be done extremely fast during field operation and also in production, or wherever needed.

Accordingly, the above-described delay determination method based on signal level shift is applicable at least in any apparatus, terminal or user equipment having an antenna switch, which is typically included in any (cellular) communication device.

Similar notions as for the antenna switch equally apply for any conceivable start point element, such as (a connection state of) a front end module switch and (a gain control value of) an amplifier or an attenuator.

As another example, the temporary signal level variation or signal level variation sequence may be caused by controlling a signal processing of a reception signal, such as by adding another signal to the reception signal, modulating another signal with the reception signal, or the like. Such another signal may for example be an interference signal and/or noise, which causes BER/SNR degradation in reception, or the like.

Figure 8:
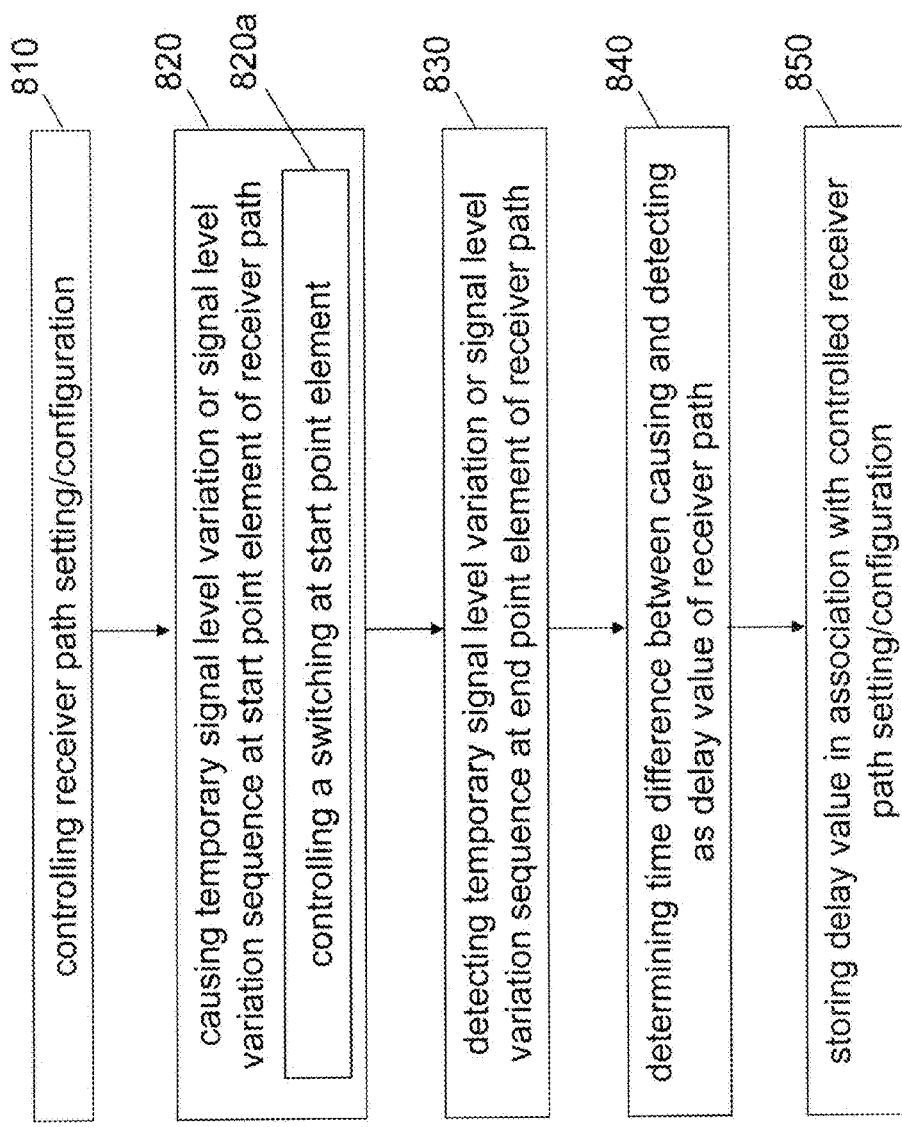
FIG. 8 shows a flowchart of a second example of a procedure of receiver path delay determination based on signal level shifting according to embodiments of the present disclosure.

FIG. 8 shows a flowchart of a second example of a procedure of receiver path delay determination based on signal level shifting according to embodiments of the present disclosure.

As shown in FIG. 8, a corresponding procedure according to embodiments of the present disclosure includes operations 820 to 840 and 820*a* which correspond to operations 710 to 730 and 710*a* of FIG. 7, respectively. Accordingly, reference is made to the description of FIG. 7, and a detailed description of such basic operations is not repeated here. Further, the procedure includes an operation (810) of controlling a setting of at least one receiver path parameter and/or at least one receiver path element, and an operation (850) of storing the determined delay value of the receiver in association with the controlled setting. As a result of the setting control operation 810, the delay value of the receiver path is determined for the controlled setting in the determination operation 840.

Figure 9:
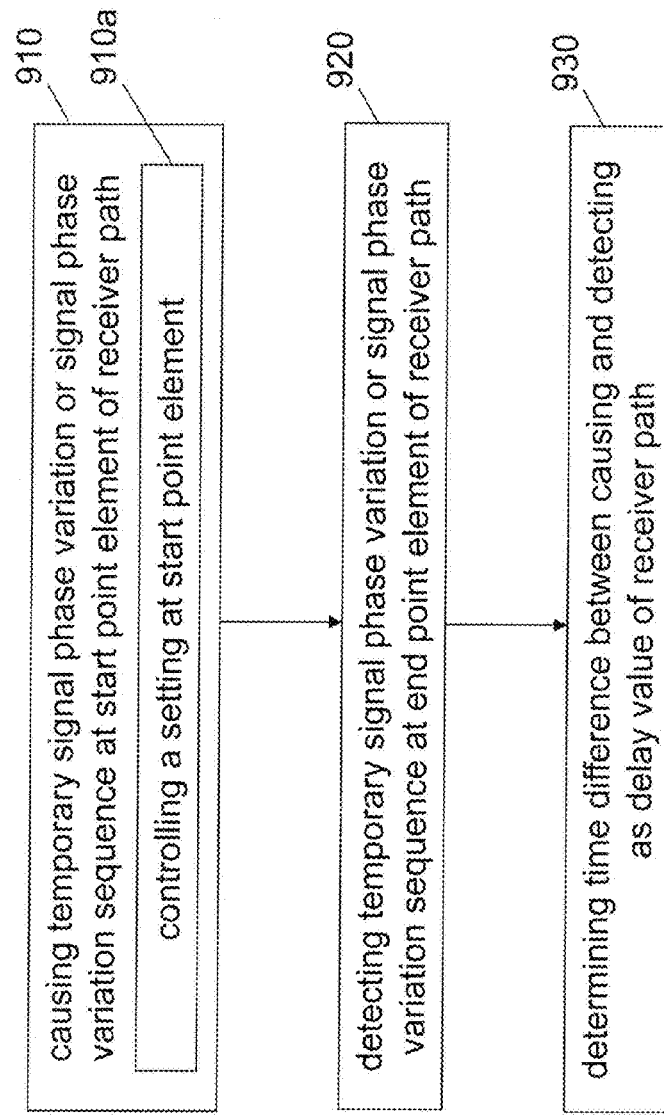
FIG. 9 shows a flowchart of a first example of a procedure of receiver path delay determination based on signal phase shifting according to embodiments of the present disclosure.

FIG. 9 shows a flowchart of a first example of a procedure of receiver path delay determination based on signal phase shifting according to embodiments of the present disclosure.

As shown in FIG. 9, a corresponding procedure according to embodiments of the present disclosure includes an operation (910) of causing a temporary signal phase variation or signal phase variation sequence at a start point element of a receiver path, an operation (920) of detecting the temporary signal phase variation or signal phase variation sequence at an end point element of the receiver path, and an operation (930) of determining a time difference between a time of causing the temporary signal phase variation or signal phase variation sequence at the start point element and a time of detecting the temporary signal phase variation or signal phase variation sequence at the end point element as a delay value of the receiver path.

According to embodiments of the present disclosure, the temporary signal phase variation or signal phase variation sequence may have a predefined/preconfigured shape or property, and may be caused at the start point element of the receiver path by way of any conceivable operation depending on the type of the start point element of the receiver path, as long as some signal phase variation or signal phase variation sequence is temporarily produced, which is detectable at the end point element of the receiver path. In embodiments, signal phase variation or signal phase variation sequence is within the dynamic range of the receiver path, e.g. A/D conversion elements thereof.

As an example, the temporary signal phase variation or signal phase variation sequence may be caused by controlling a setting of a configuration or configuration state of an antenna tuner (e.g. the ATU in the antenna interface 411 according to FIG. 4) as the start point element of the receiver path, e.g. in a programmed manner. For example, it may be caused by controlling a switch transient state, a control value of an antenna impedance tuner, a control value of an antenna aperture tuner, a control value of a controllable phase shift circuit (phase shifter), a control value of a frequency-selective filtering phase response of a filter, an isolator frequency response, or the like. Accordingly, the causing operation (910) according to embodiments of the present disclosure may include an operation (910*a*) of performing a control of a corresponding setting at the start point element, which setting actually produces the temporary signal phase variation or signal phase variation sequence. While the setting as such is performed by the correspondingly controlled tuner or the like, such control may be performed by some controlling entity such as a processor or the like so as so initiate, trigger or prompt such setting by the tuner or the like.

In this example, at the moment of measurement start, the start point element (e.g. the antenna tuner) is temporarily (controlled to be) set/adjusted, e.g. a configuration state of (registered) setting values and/or (registered) settings or setting combinations/configurations in the example of a tuner such as the antenna tuner is (controlled to be) temporarily changed, to cause a temporary signal phase shift to the receiver signal path. The thus varied signal propagates in the receiver path from the start point (i.e. the reference point or alternate reference point) to the end point (i.e. the calculation point where signal processing is done) via the intermediate receiver path element/s, such as RF FE, RFIC and RF/BB interface in the example of FIG. 3. The thus arrived temporary signal phase shift is detected at the end point element when the signal has propagated through the receiver path.

The setting of a tuner may be such that the configuration state (e.g. of the antenna tuner) is changed, for one or more configurable setting values, from a first amount to a second amount and back to the first amount. The setting of an amplifier or an attenuator may be such that the gain control value (e.g. of an LNA) is changed from LOW to HIGH to LOW or, vice versa, from HIGH to LOW to HIGH, wherein LOW and HIGH may represent any arbitrary values in this regard.

Referring to the example of an antenna tuner, the phase shift, i.e. the signal/noise phase variation, caused by setting of the antenna tuner is typically within the receiver dynamic range (whilst the dynamic range may be controlled prior to signal phase variation in order to keep the wanted signal in the operational dynamic range of the receiver path). Such temporary signal phase shift can be detected e.g. in the modem BB or the BBIC, wherein the delay measurement can be changed in a digital word. The phase shift speed, i.e. the re-setting/configuration speed of the antenna tuner, may be a control rate of UL power control, e.g. around 1500 times per second, but may vary for example according to device and/or frequency. It is to be noted that the above-mentioned numerical value typically relates to a case when a TX signal is present, whilst some other smaller/larger numerical value may be used when transmission is in an off/inactive period. So, such setting can be performed extremely fast during field operation and also in production, or wherever needed.

Accordingly, the above-described delay determination method based on signal phase shift is applicable at least in any apparatus, terminal or user equipment having an antenna tuner, including e.g. in UL MIMO/UL CA/TX diversity devices.

Similar notions as for the antenna tuner equally apply for any conceivable start point element, such as (a configuration/setting state of) a front end and (a gain control value of) an amplifier or an attenuator or a filter.

Figure 10:
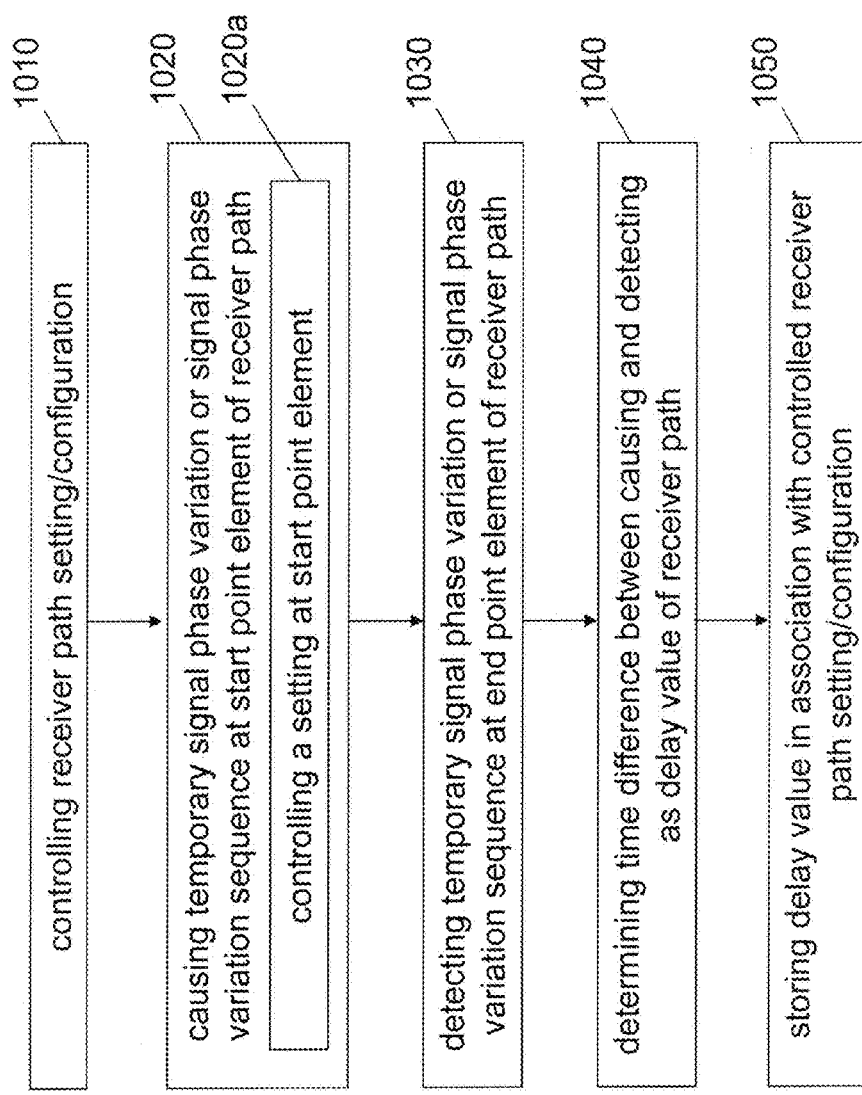
FIG. 10 shows a flowchart of a second example of a procedure of receiver path delay determination based on signal phase shifting according to embodiments of the present disclosure.

FIG. 10 shows a flowchart of a second example of a procedure of receiver path delay determination based on signal phase shifting according to embodiments of the present disclosure.

As shown in FIG. 10, a corresponding procedure according to embodiments of the present disclosure includes operations 1020 to 1040 which correspond to operations 910 to 930 of FIG. 9, respectively. Accordingly, reference is made to the description of FIG. 9, and a detailed description of such basic operations is not repeated here. Further, the procedure includes an operation (1010) of controlling a setting of at least one receiver path parameter and/or at least one receiver path element, and an operation (1050) of storing the determined delay value of the receiver in association with the controlled setting. As a result of the setting control operation 1010, the delay value of the receiver path is determined for the controlled setting in the determination operation 1040.

By way of the above-outlined procedures of any of FIGS. 7 to 10, a delay value (i.e. a hardware/software/firmware-related/clocking/interface offset error) of a receiver path is accurately determinable, namely measurable. That is to say, the receiver path delay or timing variation can be accurately measured between the start point element representing the reference point or alternate reference point for positioning or timing value measurement and the end point element representing a calculation point for the positioning or timing value measurement. As outlined below, the thus determined (i.e. measured) accurate delay value or timing variation of the receiver path is applicable for achieving an improved timing-based (e.g. OTDOA or GPS) positioning accuracy accordingly.

The receiver path delay can be calculated from the time difference between when the start point element (e.g. the antenna switch, the antenna tuner) is controlled accordingly and when the detection is carried out at the end point element. This time difference represents the hardware/software/firmware-related offset error, which should be corrected from e.g. PRS timing in order to improve OTDOA/GPS positioning accuracy. The correction may also take into account a known or predefined offset value, which may be needed for some reason, as well as timing delay/offset, clocking uncertainty, ADC uncertainty, interface periodicity, terminal reference point and measurement point signal path delay, or the like.

In order to enable measurement/determination of the relevant time difference, the exact times/timings of the respective operations of causing and detecting the temporary signal level variation or signal level variation sequence at the start point element and the end point element are to be known. To this end, some embodiments have a common time base or timing control of means for causing the temporary signal level variation or signal level variation sequence at the start point element and means for detecting the temporary signal level variation or signal level variation sequence at the end point element. Namely, the time base or timing control may be aligned between the start point element and the end point element. For example, the antenna switch may be controlled by RF MIPI, which timing is aligned with that of the modem digital BB or BBIC, thus enabling a proper and accurate time-related processing. For example, the antenna tuner may be controlled by any one RF MIPI, GPO, SPI, I2C or a single wire interface, which timing is aligned with that of the modem digital BB or BBIC, thus enabling a proper and accurate time-related processing.

Accordingly, the delay can then be calculated between a timing of (a control of) the receiver path start point to change state or control value and a timing of an arrival of the thus varied signal at the receiver path end point.

In the above-outlined procedures of any of FIGS. 8 and 10, a receiver path setting/configuration is specifically established so that the receiver path delay value is determined for a specific receiver path setting/configuration, for which the receiver path delay is desired or required. To this end, any active parts of a receiver path may be controlled accordingly, for example. For example, the receiver path setting/configuration may be controlled to be equal or equivalent to a receiver path setting/configuration/clocking, with which a positioning-related signal (e.g. a PRS signal) has been received recently or last time, or with which a number of positioning-related signals (e.g. PRS signals) used for a preceding timing value measurement have been received. In terms of applicable receiver path parameters and/or receiver path elements, reference is made to the foregoing description in connection with FIGS. 2 to 4. For example, HW-related receiver path parameters may include reception bandwidth (BW), clocking, reception resource blocks (RB), reception setup, RF-BB interface periodicity, or the like. In such a case, the thus determined receiver path delay is directly associated with the receiver path setting/configuration influencing the delay of the positioning-related signal and, thus, a corresponding positioning error.

According to embodiments of the present disclosure, the receiver path may be configured as desired as a basis for the delay determination thereof, i.e. a desired receiver path configuration may be established. Thereby, a single delay value for a specific receiver path configuration or a plurality of delay values for a plurality of specific receiver path configurations may be determined. In view thereof, the procedure according to embodiments of the present disclosure is operable during any one of field operation, production testing, self-testing, production tuning and performance testing of the apparatus in question e.g. a terminal, user equipment, mobile station or modem.

According to embodiments of the present disclosure, an alternate receiver path may be utilized (e.g. configured as desired) as a basis for the delay determination of an actually operable receiver path for which the delay is to be determined, i.e. a desired receiver path configuration may be established on an alternate receiver path rather than on the receiver path in question (wherein the alternate receiver path may have a similar or equivalent configuration as compared to the receiver path in question). Namely, the temporary signal variation may be caused, e.g. during receipt of a positioning-related signal for timing value measurement via a receiver path, in a signal applied to an alternate receiver path at a start point element of the alternate receiver path, wherein the alternate receiver path has a corresponding receiver path configuration to the receiver path via which the positioning-related signal is being received. Then, the temporary signal variation may be detected at an end point element of the alternate receiver path, and a time difference between the time of causing the temporary signal variation at the start point element and the time of detecting the temporary signal variation at the end point element may be determined as a delay value of the receiver path.

For example, when the OTDOA-related delay value of a receiver path A is to be determined, the delay determination on the basis of the temporary signal variation may be performed on an alternate receiver path B with the (substantially) same or (at least) similar/akin configuration. To this end, receiver path B may be controlled to exhibit the (substantially) same or (at least) similar/akin (e.g. known or presently operable) settings of receiver path A. Thus, the hardware/software/firmware-related offset error does not need to be measured on receiver path A, but instead may be measured on receiver path B with the (substantially) same or (at least) similar/akin setting as for receiver path A being applicable thereon. Accordingly, the delay value may be determined on/for receiver path B, and may be used (as a substitute or estimate) for receiver path A. Such approach is for example applicable in/for a diversity receiver, wherein a main branch may represent a receiver path in question and a diversity branch may represent an alternate receiver path. Besides similar advantages as outlined above, such approach is beneficial in an apparatus having multiple receiver paths (such as e.g. a diversity receiver), if a delay value determination (i.e. measurement of a hardware/software/firmware-related offset error) on an actually operable or dedicated receiver path may cause performance degradation thereon. Whilst the accuracy of the delay value determination might slightly degrade due to adjustment inaccuracy between the two receiver paths involved, the delay value determined on the alternate receiver path may be even better than any other estimate (as filters in different paths could be of different types, have different group delays, or the like).

As outlined above, according to embodiments of the present disclosure, the setting(s) may be controlled on an (actually) operable receiver path such as a receiver path for receiving a positioning-related signal or an alternate receiver path to have a corresponding receiver path configuration as the (actually) operable receiver path such as the receiver path for receiving the positioning-related signal, wherein the corresponding receiver path configuration is a (functionally) equivalent receiver path configuration with a (substantially) same or (at least) similar/akin setting.

According to embodiments of the present disclosure, the receiver path delay determination scheme may be of a hybrid nature, i.e. both the receiver path delay determination based on signal level shifting, as described below in connection with FIGS. 7 and 8, and the receiver path delay determination based on signal phase shifting, as described below in connection with FIGS. 9 and 10, may be used in a common/combined manner.

On the one hand, both types of receiver path delay determination may be applied simultaneously to determine the receiver path delay, i.e. timing offset or variation, which is impacted by the start point element such as the antenna interface 411 according to FIG. 4 (e.g. the antenna tuner and the antenna switch thereof).

Namely, the causing operation 610 may include both causing a temporary signal level variation or signal level variation sequence according to operation 710 and causing a temporary signal phase variation or signal phase variation sequence according to operation 910, the detecting operation 620 may include detecting both the caused temporary signal level variation or signal level variation sequence and the caused temporary signal phase variation or signal phase variation, and the determining operation 630 may include determining a time difference between a time of causing both types of temporary signal variations at the start point element and a time of detecting both types of temporary signal variations at the end point element as a delay value of the receiver path. Stated in other words, such a receiver path delay determination scheme corresponds to a combination of corresponding operations in the procedures according to FIGS. 7 and 9 or the procedures according to FIGS. 8 and 10.

For example, the receiver path delay, which is impacted by used settings of an antenna tuner and/or an antenna switch, can be determined by simultaneously commanding a corresponding measurement trigger to both antenna tuner and antenna switch or some special purpose functionality like a controllable phase shifter, a controllable frequency selective filter, or the like, and measuring the resulting time difference in the modem BB or BBIC. Alternatively, the receiver path delay, which is impacted by used settings of an antenna tuner, can be determined by commanding a corresponding measurement trigger to both antenna tuner and antenna switch with a predefined time period/lag there-between and measuring the resulting time difference in the modem BB or BBIC (wherein the predefined time period/lag between the measurement triggers is to be extracted).

On the other hand, both types of receiver path delay determination may be applied selectively to determine the receiver path delay, i.e. timing offset or variation, which is impacted by the start point element such as the antenna interface 411 according to FIG. 4 (e.g. the antenna tuner or the antenna switch thereof).

Namely, the causing operation 610 may include either causing a temporary signal level variation or signal level variation sequence according to operation 710 or causing a temporary signal phase variation or signal phase variation sequence according to operation 910, the detecting operation 630 may correspondingly include detecting either the caused temporary signal level variation or signal level variation sequence or the caused temporary signal phase variation or signal phase variation, and the determining operation 630 may correspondingly include determining a time difference between a time of causing either type of temporary signal variations at the start point element and a time of detecting either type of temporary signal variations at the end point element as a delay value of the receiver path. Stated in other words, one of the procedures according to FIGS. 7 and 9 or the procedures according to FIGS. 8 and 10 may be selected and applied for such a receiver path delay determination scheme.

Figure 11:
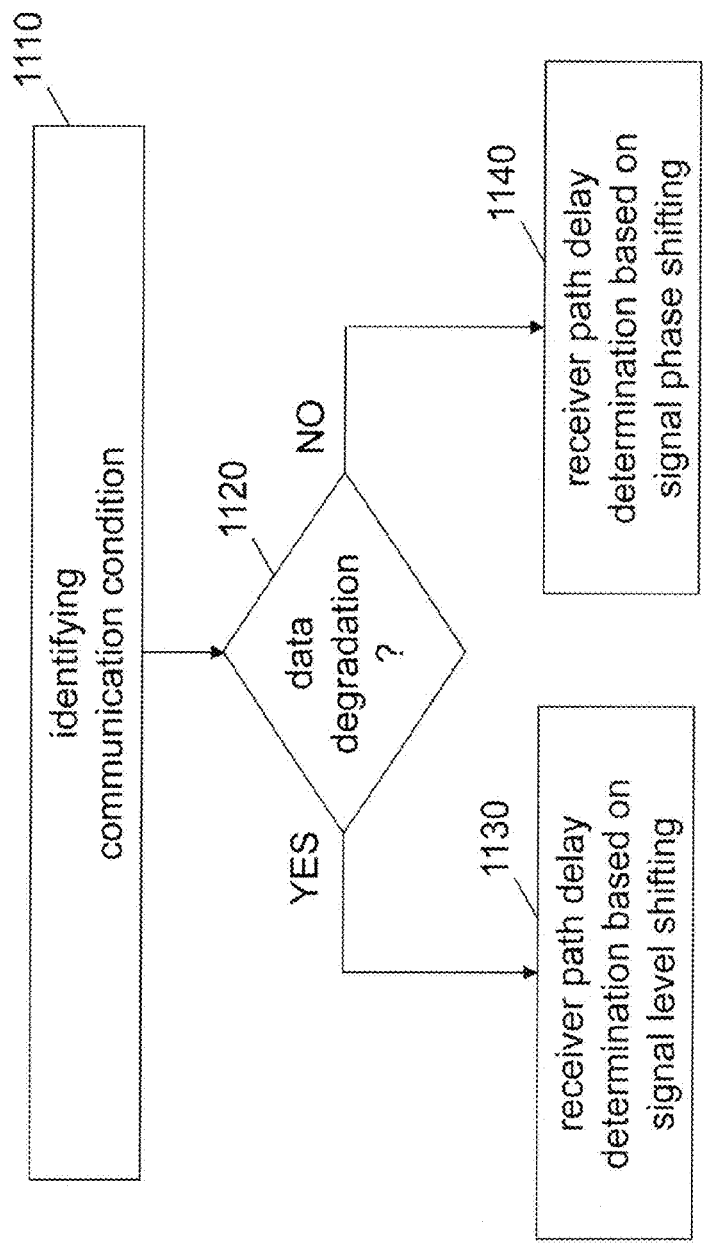
FIG. 11 shows a flowchart of an example of a procedure of selection of a receiver path delay determination scheme according to embodiments of the present disclosure.

FIG. 11 shows a flowchart of an example of a procedure of selection of a receiver path delay determination scheme according to embodiments of the present disclosure.

As shown in FIG. 11, a corresponding procedure according to embodiments of the present disclosure includes an operation (1110) of identifying a communication condition (i.e. an operational condition on a communication link between the apparatus to be located and a network entity or the like), an operation (1120) of judging whether or not the identified communication condition causes a data degradation on the receiver path, and an operation (1130) of determining the receiver path delay based on signal level shifting when the judging is affirmative (i.e. the identified communication condition causes a data degradation on the receiver path) or an operation (1140) of determining the receiver path delay based on signal phase shifting when the judging is negative (i.e. the identified communication condition does not cause a data degradation on the receiver path).

According to embodiments of the present disclosure, any communication condition could be utilized, which is applicable as a selection criterion/parameter, i.e. is indicative of non-/occurrence of data degradation on the receiver path. In this regard, data degradation on the receiver path may refer to DL and/or UL data interference, corruption or blanking, data throughput performance reduction and/or interference, corruption or blanking, data throughput performance reduction to alternate radio access technology, or the like. For example, the signal level shift method is used when data blanking/corruption will not occur due to communication link signaling or communication link signaling can be blanked/corrupted/interfered in view of the identified communication condition. Otherwise, the signal phase shift method is used when data blanking/corruption will occur due to communication link signaling or communication link signaling should not be blanked/corrupted/interfered in view of the identified communication condition (i.e. using the signal level shift method would be inappropriate in view of the identified communication condition). In this regard, it is to be noted that, e.g. in a diversity/MIMO receiver continuously receiving both diversity/MIMO signals, modem data throughput performance will not degrade due to antenna tuner phase shift variation, and thus receiver path delay determination based on based on signal phase shifting is not detectable by the user.

According to embodiments of the present disclosure, a triggering control of the receiver path delay determination according to embodiments of the present disclosure is provided.

Figure 12:
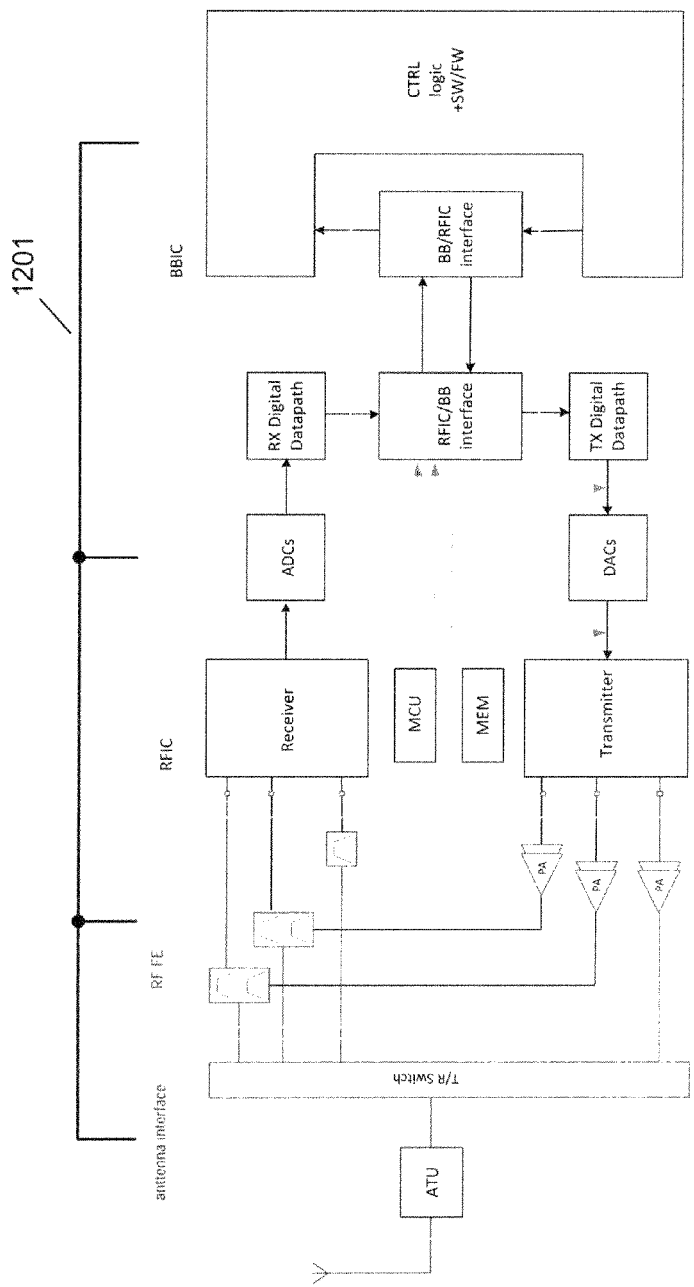
FIG. 12 shows a schematic block diagram illustrating a first example of a control structure of a receiver/transmitter path according to embodiments of the present disclosure.

FIG. 12 shows a schematic block diagram illustrating a first example of a control structure of a receiver/transmitter path according to embodiments of the present disclosure.

As shown in FIG. 12, the thus illustrated receiver/transmitter path corresponds to that of FIG. 4, and thus reference is made to the description of FIG. 4 for details thereof. The thus illustrated receiver/transmitter path may represent that of a main or single antenna arrangement. In the thus illustrated receiver/transmitter path, a control path 1201 is provided between (a control interface of) the RF FE, (a control interface of) the antenna interface (or, more specifically, the ATU), and both the RFIC and the BBIC. That is, in addition to a control access to the RF FE and the antenna interface from the RFIC, there is also provided a control access to the RF FE and the antenna interface from the BBIC. A triggering control according to embodiments of the present disclosure may be realized by way of provision of a time stamp, which specifies a time for triggering the temporary signal variation for receiver path delay determination, from the BBIC to the RF FE and/or the antenna interface via the control path 1201.

It is to be noted that, while the control path 1201 in FIG. 12 is illustrated in an example as being connected to both the RF FE and the antenna interface, a corresponding control line/path according to embodiments of the present disclosure may equally be connected to only one of the RF FE and the antenna interface (or, more specifically, the ATU). Generally, any element or component having a control interface or the like, which is connected to a corresponding control line from the RFIC and/or the BBIC (or modem BB), may be applied as a start point element according to embodiments of the present disclosure.

Figure 13:
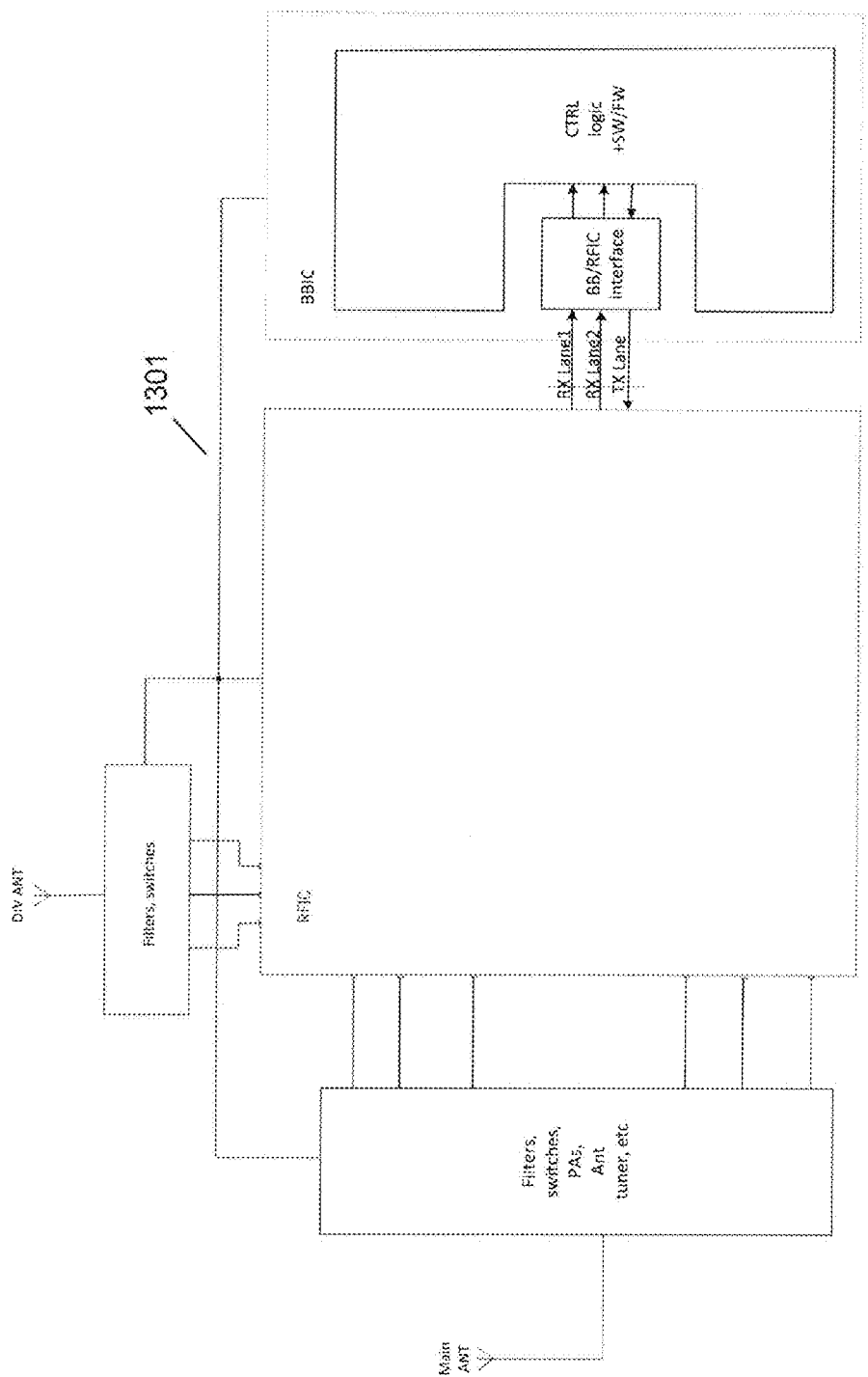
FIG. 13 shows a schematic block diagram illustrating a second example of a control structure of a receiver/transmitter path according to embodiments of the present disclosure.

FIG. 13 shows a schematic block diagram illustrating a second example of a control structure of a receiver/transmitter path according to embodiments of the present disclosure.

As shown in FIG. 13, the thus illustrated receiver/transmitter path is similar to that of FIG. 4, and thus reference is made to the description of FIG. 4 for details thereof. The thus illustrated receiver/transmitter path may represent that of a diversity or alternate antenna arrangement or an antenna system arrangement. In the thus illustrated receiver/transmitter path, two antennas are illustrated as an example, which are denoted as main antenna and diversity antenna, and each of the two antennas has its own antenna interface and RF FE portion, which are denoted by reference to filters, switches, etc. Further, a control path 1301 is provided between (a control interface of) the respective RF FE and both the RFIC and the BBIC. That is, in addition to a control access to the respective RF FE from the RFIC, there is also provided a control access to the respective RF FE from the BBIC. A triggering control according to embodiments of the present disclosure may be realized by way of provision of a time stamp, which specifies a time for triggering the temporary signal variation for receiver path delay determination, from the BBIC to the respective RF FE via the control path 1301.

As can be seen from FIGS. 12 and 13, time stamp based triggering control of the receiver path delay determination according to embodiments of the present disclosure is applicable to a main/single antenna, a diversity/multiple antenna, alternate antennas, and an antenna system.

As can be seen from FIGS. 12 and 13, the BBIC or modem BB is enabled to act as master controller for the RF FE, at least in terms of receiver path delay determination, irrespective of the number of antennas, receiver front ends, integration level of RF, BB and application circuitries, and the like. Accordingly, such control structures are equally applicable for a receiver/transmitter path in which the RF FE is shared with multiple RATs/radios and there are multiple control entities for the RF FE and/or the antenna interface (e.g. in the RFIC). Even in such receiver/transmitter paths, the control structures according to embodiments of the present disclosure enable initiation and performing of receiver path delay determination exactly at a specified time.

The control interface of the RF FE and/or the antenna interface, via which the BBIC or modem BB has control access via the control path 1201 or 1301, may be any multi-wire or single-wire controlling interface such as, for example, RF FE MIPI interface, SPI interface, etc.

Figure 14:
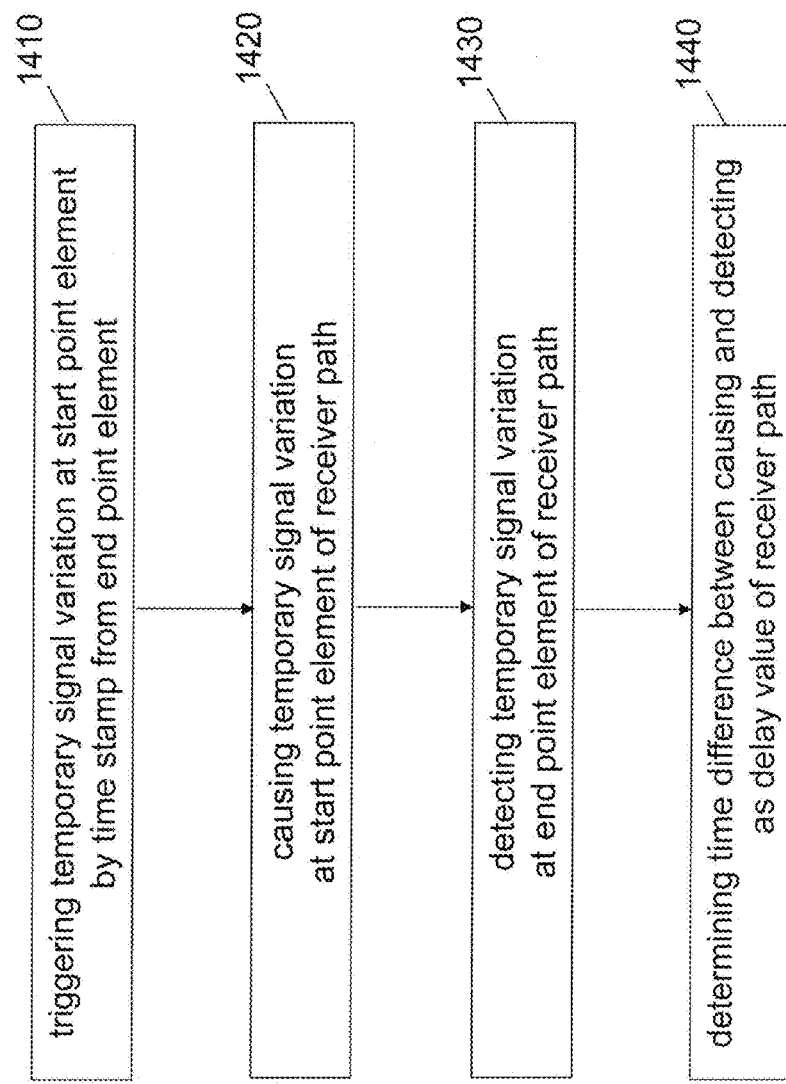
FIG. 14 shows a flowchart of an example of a procedure of control of receiver path delay determination according to embodiments of the present disclosure.

FIG. 14 shows a flowchart of an example of a procedure of control of receiver path delay determination according to embodiments of the present disclosure.

As shown in FIG. 14, a corresponding procedure according to embodiments of the present disclosure includes an operation (1410) of triggering the causing of the temporary signal variation at the start point element of the receiver path at a specific time specified by a time stamp issued by the end point element of the receiver path, and a sequence of operations 1420, 1430 and 1440, which corresponds to any one of the sequence of operations described in connection with FIGS. 6 to 10. Accordingly, reference is made to the description of FIGS. 6 to 10 and a detailed description of such operations is not repeated here.

In the triggering operation 1410, a time stamp may be provided from the end point element of the receiver path to a control interface of the start point element of the receiver path (such as e.g. the RF FE and/or the antenna interface) as a command sequence, a trigger command sequence or a group trigger command sequence.

Such command sequence/s may be provided either prior to or after reception of the positioning-related signal such as the PRS signal/s (so that the receiver path delay determination may be performed prior to, during or after reception of the positioning-related signal). Further, such command sequence/s may be provided with a serial clock (SCLK) frequency which is fixed or a serial clock (SCLK) frequency which is controlled/changed as needed, e.g. increased in order to increase accuracy of receiver path delay determination.

In some embodiments, command sequences prior to time stamp triggering may come from an active RF FE/antenna interface control master RFIC circuitry or RF IC circuitries. In some embodiments, command sequences prior to time stamp triggering may be issued by BBIC, modem BB, EM/PM or any alternate controlling circuitry.

By way of the time stamp based triggering control of the receiver path delay determination according to embodiments of the present disclosure, an improved accuracy of receiver path delay determination may be achieved.

This is because the triggering control for the temporary signal variation timing is originated and directly provided from the element where PRS signal measurement and delay measurement are performed, i.e. the BBIC or modem BB. Accordingly, when initiating time stamp controlling of RF front end and/or antenna interface from BBIC or modem BB (as a master), less timing latency, inaccuracy, uncertainty, or the like is involved in the thus triggered receiver path delay determination than in a case in which the timing of the RF front end and/or the antenna interface is controlled by the RFIC (as a master). That is to say, by way of the stamp based triggering control from BBIC or modem BB (as a master), it is avoided that the RF FE and/or the antenna interface gets modem BB control commands, through the RFIC, via different interfaces, functional blocks, FW/SW components, etc., which may have different clock bases, latencies, inaccuracies or the like. Thereby, a cumulative error of timing control accuracy of the RF FE may be decreased, thus improving accuracy of receiver path delay determination.

In order to ensure accurate receiver path delay determination, it is sufficient that the BBIC or modem BB has an accurate timing, whilst (at least in terms of receiver path delay determination) timing/controlling accuracy requirements of the RFIC or the like may be relaxed.

With the time stamp based triggering control of the receiver path delay determination according to embodiments of the present disclosure, receiver path delay determination may be performed separately in each (modem) receiver path/branch or any alternate receiver path/branch. In this regard, it is possible to issue time stamps for exactly the same time for receiver path delay determination such that receiver path delay determination may be performed at the same time for/in various (modem) receiver paths/branches. Also, it is possible to issue time stamps for different same times for receiver path delay determination such that receiver path delay determination may be performed at different times for/in various (modem) receiver paths/branches, e.g. for different antennas. Thereby, it may be avoided that shared antenna system and alternate RAT/radio transmission/reception performance mutually interfere with each other.

Figure 15:
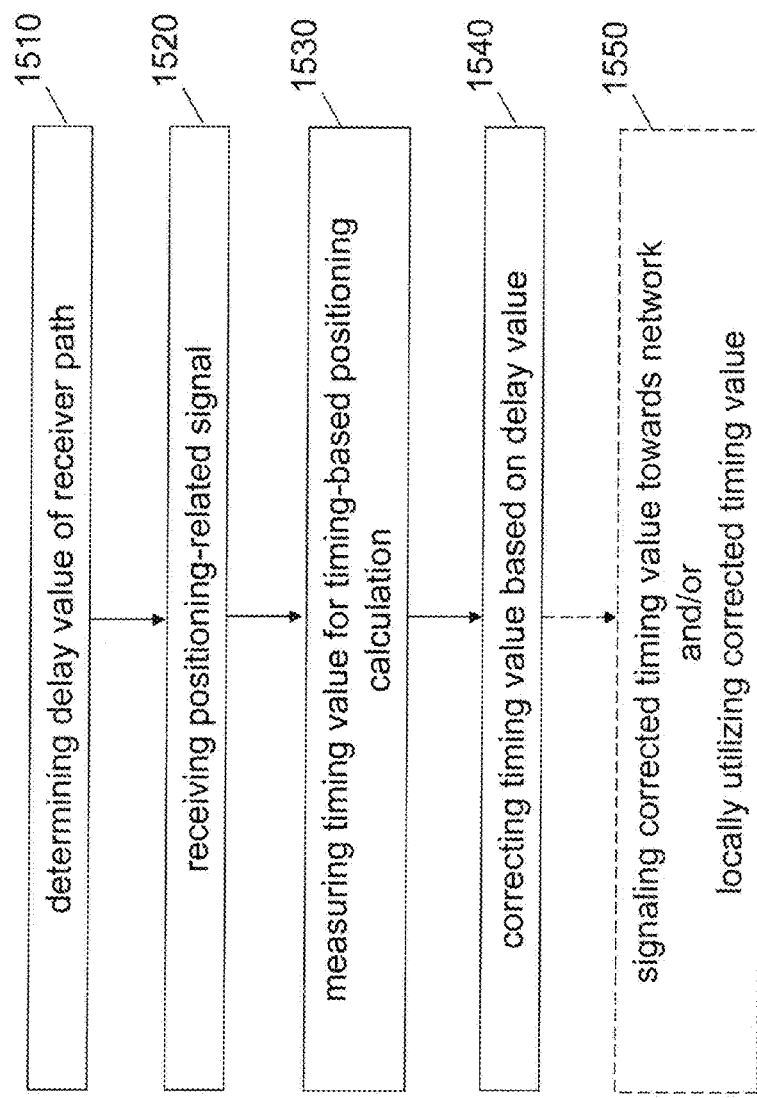
FIG. 15 shows a flowchart of an example of a procedure of timing value correction according to embodiments of the present disclosure.

FIG. 15 shows a flowchart of an example of a procedure of timing value correction according to embodiments of the present disclosure.

As shown in FIG. 15, a corresponding procedure according to embodiments of the present disclosure includes an operation (1510) of determining a delay value of a receiver path for receiving a positioning-related signal for timing value measurement. Such operation corresponds to any one of the sequence of operations described in connection with FIGS. 6 to 10. Accordingly, reference is made to the description of FIGS. 6 to 10 and a detailed description of such operations is not repeated here. Further, the procedure includes an operation (1520) of receiving the positioning-related signal for timing value measurement via the receiver path, an operation (1530) of measuring a timing value for timing-based positioning calculation on the basis of the received positioning-related signal, and an operation (1540) of correcting the measured timing value on the basis of the determined delay value of the receiver path.

According to embodiments of the present disclosure, the correcting may be accomplished by adding/subtracting the determined delay value to/from the measured timing value so as to derive a corrected timing value.

As shown by dashed lines in FIG. 15, a corresponding procedure according to embodiments of the present disclosure may optionally also include an operation (1550) of signaling the corrected timing value (as well as, possibly, base station physical cell IDs, global cell IDs, transmitting antenna IDs for timing measured signals, frequencies of measured position related signals, direction of measured position related signals, special purposes information of measured position related signals, or the like) towards a network side for timing-based positioning calculation, and/or an operation (1550) of utilizing the corrected timing value for timing-based positioning calculation (locally at the apparatus to be positioned). The signaled/utilized corrected timing value may relate to the receiver path via which the recent/last/current positioning-related signals is/are received, or the signaled/utilized corrected timing value may relate to that one of multiple receiver paths via which the recent/last/current positioning-related signals is/are received, which exhibits the best timing accuracy among the multiple receiver paths, or the signaled/utilized corrected timing value may be weighted with a weight indicative of the timing accuracy of the receiver path via which the recent/last/current positioning-related signals is/are received.

According to embodiments of the present disclosure, a signaling operation 1550 is particularly applicable for an apparatus to be positioned by OTDOA or the like, i.e. a device for which timing-based positioning calculation is remotely performed at the network side on the basis of a network/cell-originated positioning-related signal (such as that according to FIG. 2*b*), and a utilization operation 1550 is particularly applicable for a GPS positioning device or the like, i.e. a device which locally performs timing-based positioning calculation on the basis of a satellite-originated positioning-related signal (such as that of FIG. 2*a*). A combined signaling and utilization operation 1550 is particularly applicable for a combination/integration of the aforementioned devices, i.e. an apparatus operable to be positioned by a network-based technique such as OTDOA and a satellite-based technique such as GPS, Glonass, Galileo, Beidou, Compass, sbas, qzss, or the like, such as a GPS/Glonass/Galileo/Beidou/Compass/sbas/gzss/etc. positioning device or the like which is to or may also be positioned by OTDOA or the like.

Referring to the procedure of FIG. 15, it is to be noted that the positioning-related signal may not only be received after the determination operation 1510, but may also be received even before the determination operation 1510 or during the determination operation 1520. The case of receiving the positioning-related signal after the determination operation may be applicable for delay determination for example in production testing, beginning of initial operation or first usage of a corresponding device, powering on of a corresponding device, after handover to new band allocation/s, after handover to new frequency/frequencies, or the like.

According to embodiments of the present disclosure, the determined delay value and, thus, the corrected timing value may be exactly correct. Yet, in view of practical restrictions influencing accuracy (e.g. the infeasibility of implementing a full model or acquiring fully correct performance measurement results for calculation purposes), it may be the case that the determined delay value and, thus, the corrected timing value may not be exactly correct, but there remains a residual error. In such cases, a residual timing error between the corrected timing value and an actual timing value may be estimated, and the estimated residual timing error may be signaled towards a network side for timing-based positioning calculation or utilized for timing-based positioning calculation (locally at the apparatus to be positioned).

According to embodiments of the present disclosure, the aforementioned (receiver path or) reception parameters are generally indicative of a delay on the receiver path, which is caused by receiver hardware and/or software/firmware/clocking/etc. and/or controls between a reference point or an alternate reference point for positioning or timing value measurement and a calculation point for positioning or timing value measurement in the receiver path. The influence of receiver hardware and/or software/firmware on the delay on the receiver path may generally be due to different characteristics of components/functional blocks for different reception parameters and/or different timings of components/functional blocks for different reception parameters and/or the applicability/involvement of different components/functional blocks in the receiver path (e.g. in the RF receiver means or circuitry) for different reception parameters.

Generally speaking, the aforementioned (receiver path or) reception parameters may include one or more of operating bandwidth(s), receiver path identifier(s), frequency/frequencies, carrier aggregation frequency configuration(s), switch control information, filter control information, antenna control information, a number of carrier aggregation components, (frequency) band(s), a number of subcarriers at an operating bandwidth, a positioning of subcarriers at an operating bandwidth, active receiver function setup(s), passive receiver function setup(s), digital interface setup(s), digital filter setup(s), AGC setup(s), mixer setup(s), analog filter setup(s), digital receiver setup(s), analog receiver setup(s), passive receiver front-end setup(s), a digital modem setup(s), and an active receiver front-end setup, or the like. Setups may be altered according to one or more of an operating bandwidth, a receiver path identifier, a frequency, carrier aggregation frequency configuration, a switch control information, a filter control information, an antenna control information, number of carrier aggregation components, a (frequency) band, a number of subcarriers at an operating bandwidth, a positioning of subcarriers at an operating bandwidth, timing information(s), timing variation information(s), clocking, modulation, chip rate, code period, symbol rate, navigation frame rate, or the like.

According to embodiments of the present disclosure, components/functional blocks, which may have an effect on a receiver path delay and, thus, may be taken into consideration in this regard, may include one or more of antenna setup, front end routing setup, LNA setup(s), transferred-impedance filter setup(s), up-conversion mixer setup(s), down-conversion mixer setup(s), intermediate variable gain amplifier/attenuator setup(s), direct conversion demodulator setup(s), intermediate conversion demodulator setup(s), buffer setup(s), capacitor matrix setup(s), switch setup(s), data buffer setup(s), filter corner frequency setup(s), filter type and order setup(s), bypassed filter setup(s), operation duty cycle setup(s), local phase shifting setup(s), trans-impedance gain setup(s), impedance setups, I and Q channel setup(s), RC filter setup(s), bandwidth setup(s), mode setup(s), 2G/3G/LTE setup(s), filter response setup(s), tunable resistor setup(s), DC (direct current) compensation setup(s), signal sampling setup(s), averaging setup(s), digital and/or analog amplitude scaling setup(s), timing information(s) setup(s), timing variation information(s) setup(s), or the like.

More specifically, receiver path related timing/phase (delay) variations may be due to the following considerations, effects and relations.

Regarding bandwidth-related characteristics, consideration of the (operating/system/signal) bandwidth is particularly effective in communication systems capable of using plural bandwidths. As one example, in contrast to WCDMA operating on a single bandwidth, 3GPP-based LTE communication systems may be operable on various signal bandwidths, and the RF receiver delay may be different for the different signal bandwidths, e.g. for 1.4, 3, 5, 10, 20, 40, 100 MHz according to communication system configuration. For example, according to the number of HSDPA signal carriers, the applicable operating bandwidth may be 5 MHz for WCDMA and HSDPA 1-C, 10 MHz for HSDPA 2-C, 15 MHz for HSDPA 3-C, and 20 MHz for HSDPA 4-C. As another example, different global navigation satellite systems or technologies may also have different bandwidths, such as Galileo and GPS, which operate at the same frequency but differ in signal bandwidth, as mentioned above. The bandwidth-related delay may specifically apply to different bandwidths in the section between the RF receiver front end/RF receiver and the processor. It may depend on an operating bandwidth of a FIR filter (FIR: Finite Impulse Response), may depend on an operating bandwidth of a SINC filter, and/or may depend on an operating bandwidth of RX DFE (i.e. a digital front-end of the receiver, or the like).

Further, delay characteristics of the receiver path may depend on a number of subcarriers at an operating bandwidth. Also, group delay characteristics of the receiver path may depend on analog filter characteristics (wherein a peaking may typically occur close to the −3 dB corner frequency), and/or the like.

Still further, delay characteristics of the receiver path may depend on a setup of the receiver path, e.g. in terms of an active receiver function setup and/or an active receiver front-end setup. Such receiver setups may impact the delay on the receiver path as follows.

If some functionality (e.g. some component/functional block) is not used but is bypassed, the delay will be changed due to avoidance of any processing delay of the bypassed functionality (e.g. some component/functional block).

Further, the RF front end may have alternative receiver signal paths, wherein alternative signal paths may be due to interoperability. In this regard, split band filters may be implemented e.g. due to technology limitations, thus leading to different signal paths for different bandwidths. For example, it is to be noted that the bandwidth of standardized band 41 is almost 200 MHz. Still further, alternate antennas and/or intra/inter-band reception may provide for multiple signal receiver paths. In this regard, timing information to be reported to uplink may be reported from a path which is known to have the best accuracy, typically the antenna port where the signal arrives first from the network.

Further, software/firmware/clocking/etc.-originated delays, e.g. due to data buffers, interface periodicity may also be considered.

The number and type of active front end components alter phases and/or timings of received signals including positioning-related signals.

In this regard, a gain adjustment in a RF receiver chain may alter phases and/or timings according to a power level of the received signals, wherein LNAs or attenuators within the RF receiver and/or external LNAs or attenuators may influence the delay characteristics as well as analog baseband filters comprising one or more of PGAs, VGAs within the RFIC, attenuators, or the like. External LNAs may be applicable in some implementations to compensate for front end losses, e.g. in an automobile environment, when multiple antennas for MIMO functionality are present and/or the length of cables may (significantly) vary in length. Further influencing factors in this regard may include one of more of adjustable filtering bandwidths according to communication signals, adaptive antenna matching units compensating for bad transmission/reception VSWR (voltage standing wave ratio) conditions by adjusting impedances of antenna circuitry, alternative RX antennas routings, switch components group delay altering according to how many poles are concurrently active (wherein this factor may be relevant in carrier aggregation), and tunable front end filter responses varying according to how those are adjusted (e.g. on left/mid/right edge of band, TDD/FDD filtering mode according to use case, according to band in FDD, according to band in TDD mode).

In summary, all of the aforementioned considerations, effects and relations could be used as or for the at least one receiver path (or reception) parameter to be applied in procedures according to embodiments of the present disclosure. Accordingly, timing accuracy and, thus, positioning accuracy may be improved according to embodiments of the present disclosure in that a delay value of a receiver path is determined in an accurate manner, thereby allowing omission or at least reduction of variations of delay characteristics (including timing/phase variations) due to one or more of the aforementioned factors.

According to embodiments of the present disclosure, the example procedure according to FIG. 15 enables a corrected timing value to be communicated by uplink (e.g. to a server such as an E-SMLC) for location calculations, which takes into account reception parameters influencing a delay of a receiver path (between a reference point or an alternate reference point for positioning or timing value measurement and a calculation point for positioning or timing value measurement). Accordingly, the positioning-related timing parameter reported in the UL direction towards the network exhibits an increased accuracy in terms of timing, thus enabling a network-based positioning calculation with an increased accuracy in terms of positioning.

According to embodiments of the present disclosure, generally a plurality of available/applicable receiver path configurations or signal paths may be taken into consideration, both for delay value determination and/or further processing based thereon such as the signaling of the corrected timing and/or the signaling of an estimated residual timing error. For example, when more than one receiver path configuration or signal path is available/applicable for a positioning-related signal to be processed, the signaled timing value may be reported from/for a path which is known/evaluated to provide the best timing accuracy among the available/applicable paths, and/or the signaled timing value may be reported in a weighted form with the weight being indicative of the timing accuracy of the used path among the available/applicable paths. Accordingly, the apparatus carrying out the procedure according to embodiments of the present disclosure may include evaluation functionality (i.e. corresponding means or circuitry) for evaluating timing accuracy for the receiver paths via which a positioning-related signal is received, wherein the path with the best timing accuracy among the available/applicable paths and/or a weight indicative of the timing accuracy of the used path may be evaluated.

According to embodiments of the present disclosure, the timing value may be measured by using one of an intra-frequency or a single-carrier measurement, an inter-frequency or multiple-carrier measurement and a measurement on carrier aggregation components (i.e. component carriers).

When the reference cell and the neighbor cells are operating on the same carrier, i.e. the timing value is measured by using an intra-frequency or single-carrier measurement, a timing difference is not real if there is a change in RF front end path delay/phases at duration of measurement (e.g. gain for different carriers). When the reference cell and the neighbor cells are operating at different carriers, i.e. the timing value may be measured by using an inter-frequency or a multiple-carrier measurement, there may be a timing variation between carriers. When the reference cell and the neighbor cells are operating with carrier aggregation, i.e. the timing value may be measured by using measurement on carrier aggregation components, there may be a timing variation between carrier aggregation components.

It is to be noted that, by way of example and for the sake of simplicity, the example procedures are described above for processing of a single positioning-related signal at an apparatus to be positioned. Yet, in view of the description of OTDOA-based positioning with reference to FIG. 1 above, it is obvious that such procedures equally apply for a (parallel or successive) processing of plural positioning-related signals at an apparatus to be positioned. Namely, the example procedures described above may be equally applied to all positioning-related signals received at an apparatus to be positioned, e.g. PRS signals from base stations or access nodes eNB1, eNB2 and eNB3 according to the scenario of FIG. 1. In such cases, the described signal processing is applied to any one of the received signals and/or relevant receiver paths in a parallel or successive manner.

It is further to be noted that the above description refers to an example case of OTDOA-based positioning, in which the timing value includes an observed time difference of arrival with respect to a reference cell. However, the present disclosure and its embodiments are equally applicable in/for any timing-based positioning or localization (such as e.g. car radar systems or other automotive applications), as long as some timing value for timing-based positioning calculation is derived on the basis of a received positioning-related signal.

By virtue of embodiments of the present disclosure, a determination of a receiver path delay for timing value measurement (and consideration of a determined receiver path delay in timing value measurement) is achieved. Thereby, the accuracy of timing and/or timing measurement for a timing-based positioning technique may be improved at the terminal to be positioned.

According to embodiments of the present disclosure, memory requirements may be mitigated, i.e. memory may be saved, and production time preparation/configuration efforts may be mitigated as well. This is because, due to the delay value measurement capability according to embodiments of the present disclosure, i.e. the ability to measure the actually relevant receiver path properties, a need for storing a lot of predefined delay values for various (e.g. all conceivable) receiver path configurations for different settings (e.g. in a lookup table) is obviated. Further, due to the delay value measurement capability according to embodiments of the present disclosure, i.e. the ability to measure the actually relevant receiver path properties, any RFIC sample-to-sample variation can be compensated even better (i.e. more accurate) as compared with predefined values. Still further, the accuracy of timing-based positioning may be increased as compared with the use of a lookup table (recording predefined delay values for various (e.g. all conceivable) receiver path configurations for different settings), as such a lookup table is naturally not able to store all conceivable settings and values for all related signal variations and/or (production-originating) sample-related variations in individual elements of the receiver path. Furthermore, no additional verification/testing work is required in delay parameter evaluation for second source components. Namely, whilst delay parameters of similar components from different manufacturers may have different delay characteristics, it is not required to determine separately such delay characteristics of any second source component to be used in receiver path implementation, as the (overall) delay of a receiver path (including one or more of such second source components) may be accurately and reliably determined according to embodiments of the present disclosure.

When the delay measurement is executed, the receiver path parameters (also referred to as reception parameters) and/or receiver path elements may be configured, e.g. in that active parts of the receiver path are controlled to settings, in which the delay is (intended) to be measured. For example, settings according to the receiver path configuration may be controlled or established, which is, will be or has been used for receiving a positioning-related signal such as PRS for timing-based positioning.

According to embodiments of the present disclosure, the delay measurement is performed in the antenna/signal path where e.g. the PRS signal is first measured. Later on, signals in alternative antennas/signal paths have impacted more reflections and therefore measurements from these antennas/signal paths are thus less accurate.

According to embodiments of the present disclosure, the delay measurement is specifically effective for a diversity/MIMO receiver. This is because a diversity/MIMO receiver is continuously receiving both MIMO signals, and thus receiver/modem data throughput performance will not degrade due to a switching at the start point element of the receiver path (e.g. an antenna switch momentary status change), which is needed for the delay measurement, and such measurement operation is not detectable by a user.

According to embodiments of the present disclosure, DL and/or UL data corruption or blanking as well as data throughput performance reduction may be prevented or at least reduced and, thereby, the need for data retransmissions may be prevented or at least reduced accordingly. Thereby, consumption of network resources and capacity may also be reduced. Further, UE power consumption may also be reduced, thereby enhancing the operational time between charging operations. Still further, the accuracy of timing-based positioning may be increased, thereby also enabling achievement of sufficiently accurate positioning results with less measurements being required for a location request. In this regard, the accuracy of timing-based positioning with only two neighboring cells in addition to the serving cell may also be increased, which is beneficial in emergency situations or low coverage environments, for example.

According to embodiments of the present disclosure, the above and further advantages, benefits, effects and features could be achieved without requiring e.g. network support and/or additional hardware and/or (a significant amount of) additional power consumption as compared with the conventionally structured receiver or receiver/transmitter path for which the delay value may be determined.

For example, as compared with conventional systems described above, receiver path delay determination according to embodiments of the present disclosure is effected on the basis of a received (desired) signal such as a received positioning-related signal. Hence, generation of a measurement-dedicated test or reference signal (in the terminal/device in question and/or in the communication counterpart) it is not required, thus obviating the need for corresponding extra hardware and power consumption for the generation thereof. Thereby, amongst others, hardware impacts may be avoided or reduced, e.g. on costs, die area, and the like. In this regard, by obviating the need for additional hardware for injecting such test or reference signal in the receiver path under inspection, it may be beneficially avoided that the received (desired) signal is impacted thereby. Such impact could adversely result in signal power loss, which is visible to users e.g. as reduced operational cell range and/or reduced battery life time. Furthermore, it may be avoided that the received (desired) signal performance is decreased due to non-linearity, intermodulation results, or the like. Namely, no cooperation/connection between transmitter and receiver parts of a device/terminal is required for the receiver path delay determination according to embodiments of the present disclosure.

In summary, in contrast to conventional systems, receiver path delay determination according to embodiments of the present disclosure is featured—amongst others—in that external and/or internal signals (including also a received desired signal such as a positioning-related signal, a communication signal, etc.) and also noise can be used for receiver path delay determination, as the receiver path delay determination is based on a temporary signal variation (i.e. a receiver path variation) rather than a relation (such as a relative time difference) between different signals. The thus effected signal variation in the receiver path is accurately and reliably predictable (e.g. for the BBIC or the modem BB or, generally speaking, an end point element), thereby ensuring modem reception throughput performance, as compared with a relation (such as an amplitude difference) between different signals. The receiver path delay determination according to embodiments of the present disclosure may be effected during receipt of a desired signal (such as a positioning-related signal, a communication signal, etc.) so that no reception operation interruption, data loss, need for retransmissions, or the like occurs. Further, the receiver path delay determination according to embodiments of the present disclosure is capable of addressing impacts of signal bandwidth and/or frequency to delay error and/or delay measurements in the receiver path.

Generally, the above-described procedures and functions may be implemented by respective functional elements, processors, or the like, as described below. It is also noted that the above-described procedures and functions may be implemented in a software manner, e.g. in a modem software, modem algorithms, without affecting a hardware configuration of the apparatus to be positioned.

While in the foregoing, embodiments of the present disclosure are described mainly with reference to methods, procedures and functions, corresponding embodiments of the present disclosure also cover respective apparatuses, network nodes and systems, including both software and/or hardware thereof.

Respective embodiments of the present disclosure are described below referring to FIG. 16, while for the sake of brevity reference is made to the detailed description with regard to FIGS. 1 to 15.

Figure 16:
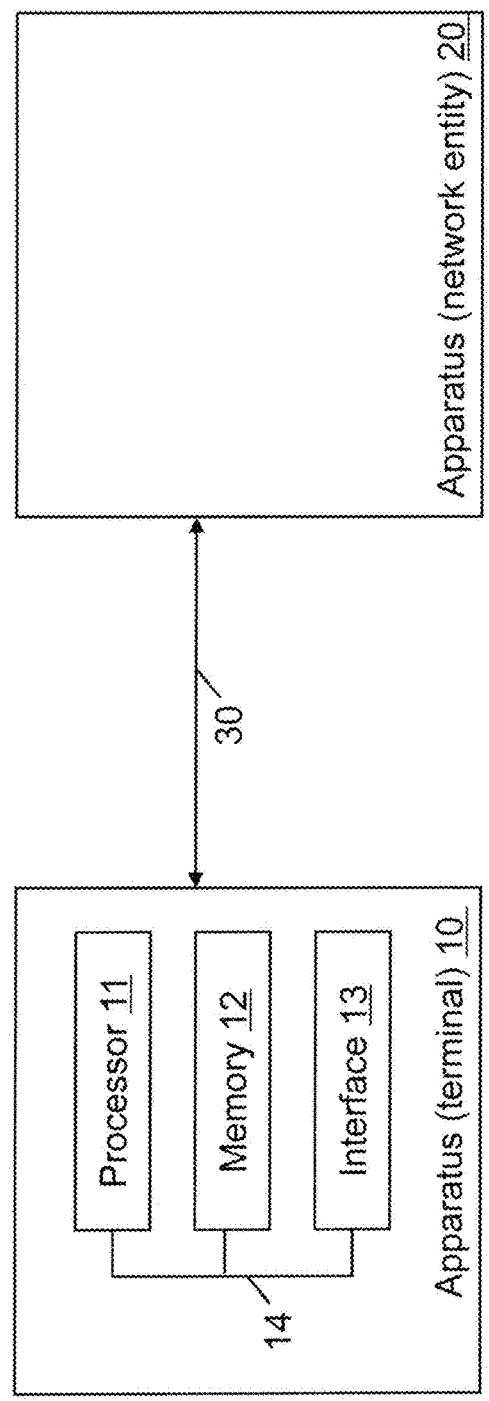
FIG. 16 shows a schematic block diagram illustrating example apparatuses according to embodiments of the present disclosure.

In FIG. 16 below, which is noted to represent a simplified block diagram, the solid line blocks are configured to perform respective operations as described above. The entirety of solid line blocks are configured to perform the methods and operations as described above, respectively. With respect to FIG. 16, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also include an arbitrary number of intermediary functional entities not shown. The direction of an arrow illustrates the direction in which certain operations are performed and/or the direction in which certain data is transferred.

Further, in FIG. 16, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Amongst others, memories are provided for storing programs or program instructions for controlling the individual functional entities to operate as described herein.

FIG. 16 shows a schematic block diagram illustrating example apparatuses according to embodiments of the present disclosure.

In view of the above, the thus described apparatuses 10 and 20 are suitable for use in practicing the embodiments of the present disclosure, as described herein.

The thus illustrated apparatus 10 may represent a (part of a) terminal such as a mobile station MS or user equipment UE or a modem (which may be installed as part of a MS or UE, but may be also a separate module, which can be attached to various devices, as described above, and may exhibit a configuration as described in conjunction with any one of FIGS. 2 to 4 and/or may be configured to perform a procedure and/or functionality as described in conjunction with any one of FIGS. 6 to 15.

The thus described apparatus 20 may represent a (part of a) network entity, such as base station or access node or any network-based controller, e.g. an eNB, an E-SMLC, a SRNC, or the like.

A terminal according to embodiments of the present disclosure may for example include any (short range, cellular, satellite, etc.) wireless communication device such as car communication devices, mobile phones, smart phones, communicators, USB devices, laptops, tablet computers, machine-to-machine terminals, device-to-device terminals, vehicle-to-vehicle terminals, vehicle-to-infrastructure, vehicle-to-roadside, routers, terminals of pico/micro/femto cells and the like with wireless communication capability, and so on.

Generally, any apparatus according to embodiments of the present disclosure may include a processing system. Such processing system may include at least one processor, and at least one memory including computer program code (and, optionally, at least one interface configured for communication with at least another apparatus).

As indicated in FIG. 16, according to embodiments of the present disclosure, the apparatus 10 may include a processing system and/or processor 11, a memory 12, and an interface 13, which are connected by a bus 14 or the like, and may be connected with the apparatus 20 through a link or connection 30. Although not illustrated, the apparatus 20 may be constructed in a similar manner as the apparatus 10.

The processor 11 and/or the interface 13 may be facilitated for communication over a (hardwire or wireless) link, respectively. The interface 13 may include a suitable receiver or a suitable transmitter-receiver combination or transceiver, which is coupled to one or more antennas or communication means for (hardwire or wireless) communications with the linked or connected device(s), respectively. The interface 13 is generally configured to communicate with another apparatus, i.e. the interface thereof.

The memory 12 may store respective programs assumed to include program instructions or computer program code that, when executed by the respective processor, enables the respective electronic device or apparatus to operate in accordance with embodiments of the present disclosure. In the memory 12, there may for example be stored previously determined receiver path delay values for certain receiver path configurations, as mentioned above.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to embodiments of the present disclosure, the apparatus 10 or its processor 11 (or a processing system thereof) according to embodiments of the present disclosure is configured to perform causing a temporary signal variation at a start point element of a receiver path for receiving a positioning-related signal for timing value measurement, detecting the temporary signal variation at an end point element of the receiver path, and determining a time difference between a time of causing the temporary signal variation at the start point element and a time of detecting the temporary signal variation at the end point element as a delay value of the receiver path.

Accordingly, stated in other words, the apparatus 10 at least includes (or components thereof are operable as) respective means for causing a temporary signal variation at a start point element of a receiver path for receiving a positioning-related signal for timing value measurement, means for detecting the temporary signal variation at an end point element of the receiver path, and means for determining a time difference between a time of causing the temporary signal variation at the start point element and a time of detecting the temporary signal variation at the end point element as a delay value of the receiver path.

For further details regarding the operability/functionality of the individual apparatuses, reference is made to the above description in connection with any one of FIGS. 1 to 15, respectively.

According to embodiments of the present disclosure, a system may include any conceivable combination of the thus depicted devices/apparatuses and other network elements, which are configured to cooperate with any one of them, respectively.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software or by hardware without changing the ideas of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, modem on module, or the like, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description includes software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, the present disclosure and/or embodiments thereof provide measures for a determination of a receiver path delay for timing value measurement. Such measures may include causing a temporary signal variation at a start point element of a receiver path for receiving a positioning-related signal for timing value measurement, detecting the temporary signal variation at an end point element of the receiver path, and determining a time difference between a timing of causing the temporary signal variation at the start point element and a timing of detecting the temporary signal variation at the end point element as a delay value of the receiver path.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

LIST OF ACRONYMS AND ABBREVIATIONS

3GPP Third Generation Partnership Project
ADC Analog Digital Converter
AGC Automatic Gain Control
ATU Antenna Tuner Unit
BB Baseband
BBIC Baseband Integrated Circuit
BER Bit Error Rate
BW Bandwidth
CA Carrier Aggregation
CTRL Control
DAC Digital Analog Converter
DFE Digital Front-End
DL Downlink
EM/PM Energy management/power management
eNB evolved Node B (E-UTRAN base station)
E-SMLC Evolved Serving Mobile Location Center
E-UTRAN Evolved UMTS Terrestrial Radio Access Network
FDD Frequency Division Duplex
FE Front-End
FEM Front-End Module
FPGA Field Programmable Gain Amplifier
FW Firmware
GNSS Global Navigation Satellite System
GPO General purpose output
GPS Global Positioning System
qzss quasi-zenith satellite system
HSDPA High Speed Data Packet Access
HW Hardware
I2C Inter-Integrated Circuit interface
ID Identifier
IF Interface
LCS Location Service/Location-based Service
LNA Low-Noise Amplifier
LTE Long Term Evolution
LTE-A Long Term Evolution Advanced
MCU Master Control Unit
MEM Memory
MIMO Multiple-Input Multiple-Output
MIPI Mobile Industry Processor Interface
MS Mobile Station
ODM Original Device/Design Manufacturer
OTDOA Observed Time Difference of Arrival
PA Power Amplifier
PGA Programmable Gain Amplifier
PRS Positioning Reference Signal
RAT Radio Access Technology
RB Resource Block
RF Radio Frequency
RFIC Radio Frequency Integrated Circuit
RNC Radio Network Controller
RX Receiver/Reception
sbas satellite-based augmentation system
SCLK Serial Clock
SNR Signal-to-Noise Ratio
SPI Serial Peripheral Interface
SRNC Serving Radio Network Controller
SW Software
TDD Time Division Duplex
T/R Transmission/Reception
TX Transmitter/Transmission
UE User Equipment
UL Uplink
UMTS Universal Mobile Telecommunications System
USB Universal Serial Bus
VGA Variable Gain Amplifier
VSWR Voltage Standing Wave Ratio
VoLTE Voice over LTE
WCDMA Wideband Code Division Multiple Access

What is claimed is:

1. A method of determining receiver path delay, the method comprising:
   causing a temporary signal variation at a start point element of a receiver path for receiving a positioning-related signal for timing value measurement;
   detecting the temporary signal variation at an end point element of the receiver path; and
   determining a time difference between a time of causing the temporary signal variation at the start point element and a time of detecting the temporary signal variation at the end point element as a delay value of the receiver path.

2. A method according to claim 1, wherein the temporary signal variation comprises a signal level variation or a signal level variation sequence.

3. A method according to claim 2, wherein the temporary signal level variation is caused by one or more of:
   controlling a switching of a connection state of an antenna switch representing the start point element of the receiver path,
   controlling a switching of a connection state of a front end switch representing the start point element of the receiver path,
   controlling a switching of a gain control value of an amplifier or attenuator representing the start point element of the receiver path,
   controlling a switching of a control value of a frequency selective filtering response and/or impedance of a filter representing the start point element of the receiver path,
   controlling a switching of a control value of an antenna aperture tuner representing the start point element of the receiver path, and
   controlling a switching of a control value of an antenna impedance tuner representing the start point element of the receiver path.

4. A method according to claim 1, wherein the temporary signal variation comprises a signal phase variation or a signal phase variation sequence.

5. A method according to claim 4, wherein the temporary signal phase variation is caused by one or more of:
   controlling a setting of a configuration state of an antenna tuner representing the start point element of the receiver path,
   controlling a switching of a control value of a frequency selective filtering response of a filter representing the start point element of the receiver path,
   controlling a switching of a control value of an antenna aperture tuner representing the start point element of the receiver path,
   controlling a switching of a control value of an antenna impedance tuner representing the start point element of the receiver path, and
   controlling a switching of a control value of a phase shifter representing the start point element of the receiver path.

6. A method according to claim 1, comprising:
   controlling a setting of at least one receiver path parameter and/or at least one receiver path element; and
   storing the determined delay value of the receiver in association with the controlled setting, wherein the delay value of the receiver path is determined for the controlled setting.

7. A method according to claim 6, wherein:
the setting is controlled to a receiver path configuration for receiving the positioning-related signal on the receiver path, and/or
the setting is controlled on a receiver path for receiving the positioning-related signal or an alternate receiver path to have a corresponding receiver path configuration as the receiver path for receiving the positioning-related signal.

8. A method according to claim 1, wherein, when the temporary signal variation comprises a signal level variation or signal level variation sequence and a signal phase variation or signal phase variation sequence, the signal level variation or signal level variation sequence and the signal phase variation or signal phase variation sequence are caused simultaneously or with a predefined time lag which is extracted in time difference determination.

9. A method according to claim 1, comprising:
identifying a communication condition; and
judging whether or not the identified communication condition causes a data degradation on the receiver path,
wherein the receiver path delay is determined with the temporary signal variation comprising a signal level variation or a signal level variation sequence when the identified communication condition is judged to cause a data degradation on the receiver path, or the receiver path delay is determined with the temporary signal variation comprising a signal phase variation or a signal phase variation sequence when the identified communication condition is judged not to cause a data degradation on the receiver path.

10. A method according to claim 1, comprising triggering the causing of the temporary signal variation at the start point element of the receiver path at a specific time specified by a time stamp issued by the end point element of the receiver path.

11. A method according to claim 10, comprising providing the time stamp from the end point element of the receiver path to a control interface of the start point element of the receiver path as a command sequence, a trigger command sequence or a group trigger command sequence.

12. A method according to claim 1, comprising:
receiving the positioning-related signal via the receiver path;
measuring a timing value for timing-based positioning calculation on the basis of the received positioning-related signal; and
correcting the measured timing value on the basis of the determined delay value of the receiver path.

13. A method according to claim 12, wherein:
the method further comprises signaling the corrected timing value towards a network side for timing-based positioning calculation, wherein the signaled corrected timing value relates to the receiver path via which the positioning-related signal is received, or the signaled corrected timing value relates to that one of multiple receiver paths via which the positioning-related signal is received which exhibits the best timing accuracy of the multiple receiver paths, or the signaled corrected timing value is weighted with a weight indicative of the timing accuracy of the receiver path via which the positioning-related signal is received, and/or
the timing value comprises an observed time difference of arrival with respect to a reference cell, and/or
the positioning-related signal comprises a positioning reference signal from one of a serving cell and a neighboring cell.

14. A method according to claim 12, wherein:
the method further comprises utilizing the corrected timing value for timing-based positioning calculation, wherein the utilized corrected timing value relates to the receiver path via which the positioning-related signal is received, or the utilized corrected timing value relates to that one of multiple receiver paths via which the positioning-related signal is received which exhibits the best timing accuracy of the multiple receiver paths, or the utilized corrected timing value is weighted with a weight indicative of the timing accuracy of the receiver path via which the positioning-related signal is received, and/or
the timing value comprises a signal propagation time with respect to a positioning satellite, and/or
the positioning-related signal comprises a positioning reference signal from a positioning satellite.

15. A method according to claim 1, wherein the delay value of the receiver path represents a delay caused by receiver hardware and/or software and/or firmware and/or clocking between the start point element representing a reference point for the timing value measurement and the end point element representing a point of the timing value measurement in the receiver path.

16. A method according to claim 1, wherein:
the method is operable at or by an apparatus, terminal, user equipment, mobile station or modem to be positioned, and/or
the receiver path comprises a receiver path of or in an apparatus, terminal, user equipment, mobile station or modem to be positioned, and/or
the method is operable during at least one of field operation, production testing, production tuning and performance testing of a terminal, user equipment, mobile station or modem, and/or
the timing value comprises an observed time difference of arrival of the positioning-related signal with respect to a reference cell.

17. Apparatus for use in determining receiver path delay on a terminal side of a cellular system, the apparatus comprising at least one processor, and at least one memory including computer program code, the at least one memory and the computer program code being configured to, with the at least one processor, cause the apparatus at least to:
cause a temporary signal variation at a start point element of a receiver path for receiving a positioning-related signal for timing value measurement;
detect the temporary signal variation at an end point element of the receiver path; and
determine a time difference between a time of causing the temporary signal variation at the start point element and a time of detecting the temporary signal variation at the end point element as a delay value of the receiver path.

18. Apparatus according to claim 17, wherein:
the apparatus is operable as or at an apparatus, terminal, user equipment, mobile station or modem to be positioned, and/or
the receiver path is a receiver path of or in an apparatus, terminal, user equipment, mobile station or modem to be positioned, and/or
the apparatus is operable during at least one of field operation, production testing, production tuning and performance testing of a terminal, user equipment, mobile station or modem, and/or the timing value comprises an observed time difference of arrival of the positioning-related signal with respect to a reference cell.

19. A non-transitory computer-readable storage medium having computer readable instructions stored thereon, the computer readable instructions being executable by a computerized device to cause the computerized device to determine receiver path delay by at least:
  causing a temporary signal variation at a start point element of a receiver path for receiving a positioning-related signal for timing value measurement;
  detecting the temporary signal variation at an end point element of the receiver path; and
  determining a time difference between a time of causing the temporary signal variation at the start point element and a time of detecting the temporary signal variation at the end point element as a delay value of the receiver path.

* * * * *